(12) United States Patent
Luo et al.

(10) Patent No.: US 10,721,054 B2
(45) Date of Patent: Jul. 21, 2020

(54) SCHEDULING OVER MULTIPLEXED RESOURCES UNDER HALF-DUPLEX CONSTRAINT

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Karl Georg Hampel, Hoboken, NJ (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/273,440

(22) Filed: Feb. 12, 2019

(65) Prior Publication Data

US 2019/0319774 A1    Oct. 17, 2019

Related U.S. Application Data

(60) Provisional application No. 62/658,438, filed on Apr. 16, 2018.

(51) Int. Cl.
*H04L 5/16* (2006.01)
*H04W 72/12* (2009.01)
(Continued)

(52) U.S. Cl.
CPC .............. *H04L 5/16* (2013.01); *H04W 40/246* (2013.01); *H04W 72/046* (2013.01); *H04W 72/0453* (2013.01); *H04W 72/1294* (2013.01)

(58) Field of Classification Search
None
See application file for complete search history.

(56) References Cited

U.S. PATENT DOCUMENTS

2018/0042031 A1    2/2018  Hampel et al.
2018/0323935 A1*  11/2018  Yerramalli ............ H04L 5/0053
(Continued)

OTHER PUBLICATIONS

Huawei, et al., "Evaluation on the Dynamic and Flexible Resource Allocation in IAB", 3GPP TSG-RAN WG1 Meeting #92bis, 3GPP Draft; R1-1804303, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 7 Pages, XP051426591, Retrieved from the Internet: URL: http://www.3gpp.org/ftp/Meetings%5F3GPP%5FSYNC/RAN1/Docs/ [retrieved on Apr. 15, 2018] Sections 1 and 2.
(Continued)

*Primary Examiner* — Anh Vu H Ly
(74) *Attorney, Agent, or Firm* — Linda G. Gunderson; Holland & Hart LLP

(57) ABSTRACT

Methods, systems, and devices for wireless communications are described. A scheduled node may transmit, by a first node in the network and to a second node in the network, an indication of a first temporal pattern of communication states for communication by the first node on a first set of resources, the first node being configured for half-duplex communications. The scheduled node may receive, from the second node, a grant of resources for performing communications on a second set of resources that are multiplexed with the first set of resources in a frequency domain, a spatial domain, or a combination thereof.

30 Claims, 14 Drawing Sheets

(51) Int. Cl.
  *H04W 72/04* (2009.01)
  *H04W 40/24* (2009.01)

(56) References Cited

U.S. PATENT DOCUMENTS

| | | | | |
|---|---|---|---|---|
| 2018/0352524 | A1* | 12/2018 | Abedini | H04L 5/0053 |
| 2019/0007963 | A1* | 1/2019 | Akkarakaran | H04W 72/0446 |
| 2019/0182837 | A1* | 6/2019 | Yao | H04W 72/0453 |
| 2019/0260532 | A1* | 8/2019 | Manolakos | H04L 5/0051 |
| 2019/0268923 | A1* | 8/2019 | Sundararajan | H04W 72/1289 |
| 2019/0335491 | A1* | 10/2019 | Venugopal | H04L 5/0091 |
| 2019/0342910 | A1* | 11/2019 | Cao | H04W 72/1289 |
| 2019/0394793 | A1* | 12/2019 | Venugopal | H04W 72/1289 |

OTHER PUBLICATIONS

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Retrieved from the Internet: URL: http://www.3gpp.org/ftp/Meetings%5F3GPP%5FSYNC/RAN1/Docs/ [retrieved on Apr. 15, 2018] Sections 2.1 and 2.2.

International Search Report and Written Opinion—PCT/US2019/023708—ISA/EPO—dated May 24, 2019.

Qualcomm Incorporated: "Resource Coordination Across IAB Topology", 3GPP TSG-RAN WG2 Meeting #101bis, 3GPP Draft; R2-1804865 Resource Coordination Across IAB Topology, 3rd Generation Partnership Project (3GPP), Mobile Competence Centre; 650, Route Des Lucioles; F-06921 Sophia-Antipolis Cedex; France, vol. RAN WG2, No. Sanya, China; Apr. 16, 2018-Apr. 20, 2018, Apr. 5, 2018 (Apr. 5, 2018), 6 Pages, XP051415179, Retrieved from the Internet: URL: http://www.3gpp.org/ftp/tsg%5Fran/WG2%5FRL2/TSGR2%5F101bis/Docs/ [retrieved on Apr. 5, 2018] Section 2.

* cited by examiner

SCHEDULING OVER MULTIPLEXED RESOURCES UNDER HALF-DUPLEX CONSTRAINT

CROSS REFERENCES

The present Application for Patent claims the benefit of U.S. Provisional Patent Application No. 62/658,438 by LUO et al., entitled "SCHEDULING OVER MULTIPLEXED RESOURCES UNDER HALF-DUPLEX CONSTRAINT," filed Apr. 16, 2018, assigned to the assignee hereof, and expressly incorporated by reference herein.

BACKGROUND

The following relates generally to wireless communications, and more specifically to scheduling over multiplexed resources under half-duplex constraint.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Some wireless communications systems, such as those operating in a millimeter wave (mmW) spectrum, may include access nodes (ANs) to facilitate wireless communication between a UE and the network. In some cases, an anchor AN may have a high-capacity, wired, backhaul connection (e.g., fiber) to the network, while communicating simultaneously with one or more ANs (e.g., relay devices) or UEs. A network that supports communications between an AN and a UE may be referred to as an access network, while a network that supports communications between one or more ANs may be referred to as a backhaul network. In deployments supporting both access and backhaul (e.g., in an Integrated Access and Backhaul (IAB) network), resource allocation may be complex due to the considerations taken into account when scheduling resources including those related to half-duplex constraints, where an AN may not be able to transmit and receive communications at the same time.

SUMMARY

The described techniques relate to improved methods, systems, devices, and apparatuses that support scheduling over multiplexed resources under half-duplex constraint. Generally, the described techniques provide a mechanism for resource coordination for half-duplex constrained communications in a network. In one scenario, the network may be an Integrated Access and Backhaul (IAB) network, a millimeter wave (mmW) network, and the like. In some cases, a first set of resources may be configured for nodes of the network (such as an access node (AN)), such that the node may schedule communications using the first set of resources. Generally, the resources of the first set of resources may be time-frequency resources used for access communications and/or backhaul communications. A node (which may be referred to as a scheduling node) may identify a resource configuration for another node (e.g., which may be referred to as a scheduled node), which may be a parent, sibling, or child node of the scheduling node. Generally, the resource configuration may include a temporal pattern of communication states for the scheduled node. In some aspects, the temporal pattern may be indicated, for a given time unit (which may be a symbol, a mini slot, a slot, and the like), as to whether the scheduled node is configured for uplink communications, downlink communications, or neither (e.g., the scheduled node being in an idle mode) during the time unit. In some aspects, the scheduling node may also identify its own temporal pattern of communication states according to the first set of resources.

In some aspects, the scheduling node may determine, based on the temporal pattern of communication states for the scheduling node and the scheduled node, a schedule for communicating with the scheduled node on the second set of resources that are multiplexed with the first set of resources. Generally, the second set of resources may be multiplexed with the first set of resources in a frequency domain and/or in a spatial domain. In some aspects, the schedule for communications may be based on half-duplex constraints, and whether the scheduling node and the scheduled node, for the time unit, are configured for uplink, downlink, or idle communication states. The scheduling node may transmit a grant to the scheduled node for resources for communications using the second set of resources. Accordingly, the scheduling node and the scheduled node may perform wireless communications via the network using the resources from the second set of resources (e.g., according to the grant).

A method of wireless communication in a network is described. The method may include transmitting, by a first node in the network and to a second node in the network, an indication of a first temporal pattern of communication states for communication by the first node on a first set of resources, the first node being configured for half-duplex communications and receiving, from the second node, a grant of resources for performing communications on a second set of resources that are multiplexed with the first set of resources in a frequency domain, a spatial domain, or a combination thereof.

An apparatus for wireless communication in a network is described. The apparatus may include a processor, memory in electronic communication with the processor, and instructions stored in the memory. The instructions may be executable by the processor to cause the apparatus to transmit, by a first node in the network and to a second node in the network, an indication of a first temporal pattern of communication states for communication by the first node on a first set of resources, the first node being configured for half-duplex communications and receive, from the second node, a grant of resources for performing communications on a second set of resources that are multiplexed with the first set of resources in a frequency domain, a spatial domain, or a combination thereof.

Another apparatus for wireless communication in a network is described. The apparatus may include means for transmitting, by a first node in the network and to a second node in the network, an indication of a first temporal pattern of communication states for communication by the first node on a first set of resources, the first node being configured for half-duplex communications and receiving, from the second node, a grant of resources for performing communications on a second set of resources that are multiplexed with the first set of resources in a frequency domain, a spatial domain, or a combination thereof.

A non-transitory computer-readable medium storing code for wireless communication in a network is described. The code may include instructions executable by a processor to transmit, by a first node in the network and to a second node in the network, an indication of a first temporal pattern of communication states for communication by the first node on a first set of resources, the first node being configured for half-duplex communications and receive, from the second node, a grant of resources for performing communications on a second set of resources that are multiplexed with the first set of resources in a frequency domain, a spatial domain, or a combination thereof.

Some examples of the method, apparatuses, and non-transitory computer-readable medium described herein may further include operations, features, means, or instructions for receiving, from the second node, a request for the first temporal pattern of communication states, where the indication may be transmitted in response to the request.

Some examples of the method, apparatuses, and non-transitory computer-readable medium described herein may further include operations, features, means, or instructions for receiving, from the second node or from a different node, a signal identifying the first set of resources, the second set of resources, or a combination thereof.

Some examples of the method, apparatuses, and non-transitory computer-readable medium described herein may further include operations, features, means, or instructions for performing, using the second set of resources in accordance with the grant, at least one of receiving a downlink communication from the second node or transmitting an uplink communication during a time period that may be associated with the first node and the second node being in an idle mode in accordance with the first and second temporal patterns of communication states.

Some examples of the method, apparatuses, and non-transitory computer-readable medium described herein may further include operations, features, means, or instructions for receiving, using the second set of resources in accordance with the grant, a downlink communication from the second node during a time period that may be associated with the first node being in an idle mode or a receive mode in accordance with the first temporal pattern of communication states.

Some examples of the method, apparatuses, and non-transitory computer-readable medium described herein may further include operations, features, means, or instructions for transmitting, using the second set of resources in accordance with the grant, an uplink communication to the second node during a time period that may be associated with the first node being in an idle mode or a transmit mode in accordance with the first temporal pattern of communication states.

In some examples of the method, apparatuses, and non-transitory computer-readable medium described herein, the grant of resources may be based on the indication.

In some examples of the method, apparatuses, and non-transitory computer-readable medium described herein, the grant of resources may be for performing communications with the second node.

In some examples of the method, apparatuses, and non-transitory computer-readable medium described herein, the network includes an IAB network.

In some examples of the method, apparatuses, and non-transitory computer-readable medium described herein, the first set of resources may be associated with access communications and the second set of resources may be associated with at least one of a backhaul communications, an access communications, or a combination thereof.

In some examples of the method, apparatuses, and non-transitory computer-readable medium described herein, the second set of resources may be associated with a backhaul communications in an IAB network, and where the first temporal pattern of communication states may be based on an inter-relay discovery communications in the IAB network.

A method of wireless communication in a network is described. The method may include identifying, at a second node in the network, a first temporal pattern of communication states for communication by a first node in the network on a first set of resources, the first node being configured for half-duplex communications, identifying, at the second node in a network, a second temporal pattern of communication states for communicating on the first set of resources, the second node being configured for half-duplex communications, determining, based on the first and second temporal patterns of communication states, a schedule for communicating with the first node on a second set of resources that are multiplexed with the first set of resources in a frequency domain, a spatial domain, or a combination thereof, and transmitting, to the first node, a grant of resources for communications via the second set of resources in accordance with the schedule.

An apparatus for wireless communication in a network is described. The apparatus may include a processor, memory in electronic communication with the processor, and instructions stored in the memory. The instructions may be executable by the processor to cause the apparatus to identify, at a second node in the network, a first temporal pattern of communication states for communication by a first node in the network on a first set of resources, the first node being configured for half-duplex communications, identify, at the second node in a network, a second temporal pattern of communication states for communicating on the first set of resources, the second node being configured for half-duplex communications, determine, based on the first and second temporal patterns of communication states, a schedule for communicating with the first node on a second set of resources that are multiplexed with the first set of resources in a frequency domain, a spatial domain, or a combination thereof, and transmit, to the first node, a grant of resources for communications via the second set of resources in accordance with the schedule.

Another apparatus for wireless communication in a network is described. The apparatus may include means for identifying, at a second node in the network, a first temporal pattern of communication states for communication by a first node in the network on a first set of resources, the first node being configured for half-duplex communications, identifying, at the second node in a network, a second temporal pattern of communication states for communicating on the first set of resources, the second node being configured for half-duplex communications, determining, based on the first and second temporal patterns of communication states, a schedule for communicating with the first node on a second set of resources that are multiplexed with the first set of resources in a frequency domain, a spatial domain, or a combination thereof, and transmitting, to the first node, a grant of resources for communications via the second set of resources in accordance with the schedule.

A non-transitory computer-readable medium storing code for wireless communication in a network is described. The code may include instructions executable by a processor to identify, at a second node in the network, a first temporal pattern of communication states for communication by a first node in the network on a first set of resources, the first node being configured for half-duplex communications, identify, at the second node in a network, a second temporal pattern of communication states for communicating on the first set of resources, the second node being configured for half-duplex communications, determine, based on the first and second temporal patterns of communication states, a schedule for communicating with the first node on a second set of resources that are multiplexed with the first set of resources in a frequency domain, a spatial domain, or a combination thereof, and transmit, to the first node, a grant of resources for communications via the second set of resources in accordance with the schedule.

In some examples of the method, apparatuses, and non-transitory computer-readable medium described herein, identifying the first temporal pattern of communication states may include operations, features, means, or instructions for transmitting a request for the first temporal pattern of communication states to the first node and receiving, from the first node, an indication of the first temporal pattern of communication states.

In some examples of the method, apparatuses, and non-transitory computer-readable medium described herein, identifying the first temporal pattern of communication states may include operations, features, means, or instructions for configuring the first node for communication on the first set of resources.

In some examples of the method, apparatuses, and non-transitory computer-readable medium described herein, identifying the first temporal pattern of communication states may include operations, features, means, or instructions for receiving, from the first node or from a different node, a signal indicating the first temporal pattern of communication states.

Some examples of the method, apparatuses, and non-transitory computer-readable medium described herein may further include operations, features, means, or instructions for receiving, from the first node or from a different node, a signal identifying the first set of resources, the second set of resources, or a combination thereof.

Some examples of the method, apparatuses, and non-transitory computer-readable medium described herein may further include operations, features, means, or instructions for performing, using the second set of resources and in accordance with the grant, at least one of receiving an uplink communication from the first node or transmitting a downlink communication to the first node during a time period that may be associated with the first node and the second node being in an idle mode in accordance with the first and second temporal patterns of communication states.

Some examples of the method, apparatuses, and non-transitory computer-readable medium described herein may further include operations, features, means, or instructions for receiving, using the second set of resources and in accordance with the grant, an uplink communication from the first node during a time period that may be associated with the first node being in an idle mode or a transmit mode and the second node being in a receive mode in accordance with the first and second temporal patterns of communication states.

Some examples of the method, apparatuses, and non-transitory computer-readable medium described herein may further include operations, features, means, or instructions for transmitting, using the second set of resources and in accordance with the grant, a downlink communication to the first node during a time period that may be associated with the first node being in an idle mode or a receive mode and the second node being in a transmit mode in accordance with the first and second temporal patterns of communication states.

In some examples of the method, apparatuses, and non-transitory computer-readable medium described herein, the grant of resources may be for communications between the first node and the second node.

In some examples of the method, apparatuses, and non-transitory computer-readable medium described herein, the network includes an IAB network, between the first node and the second node.

In some examples of the method, apparatuses, and non-transitory computer-readable medium described herein, the first set of resources may be associated with access communications and the second set of resources may be associated with at least one of a backhaul communications, an access communications, or a combination thereof.

In some examples of the method, apparatuses, and non-transitory computer-readable medium described herein, the second set of resources may be associated with an IAB network, and where the first and second temporal patterns of communication states may be based on an inter-relay discovery communications in the IAB network.

DETAILED DESCRIPTION

Figure 1:
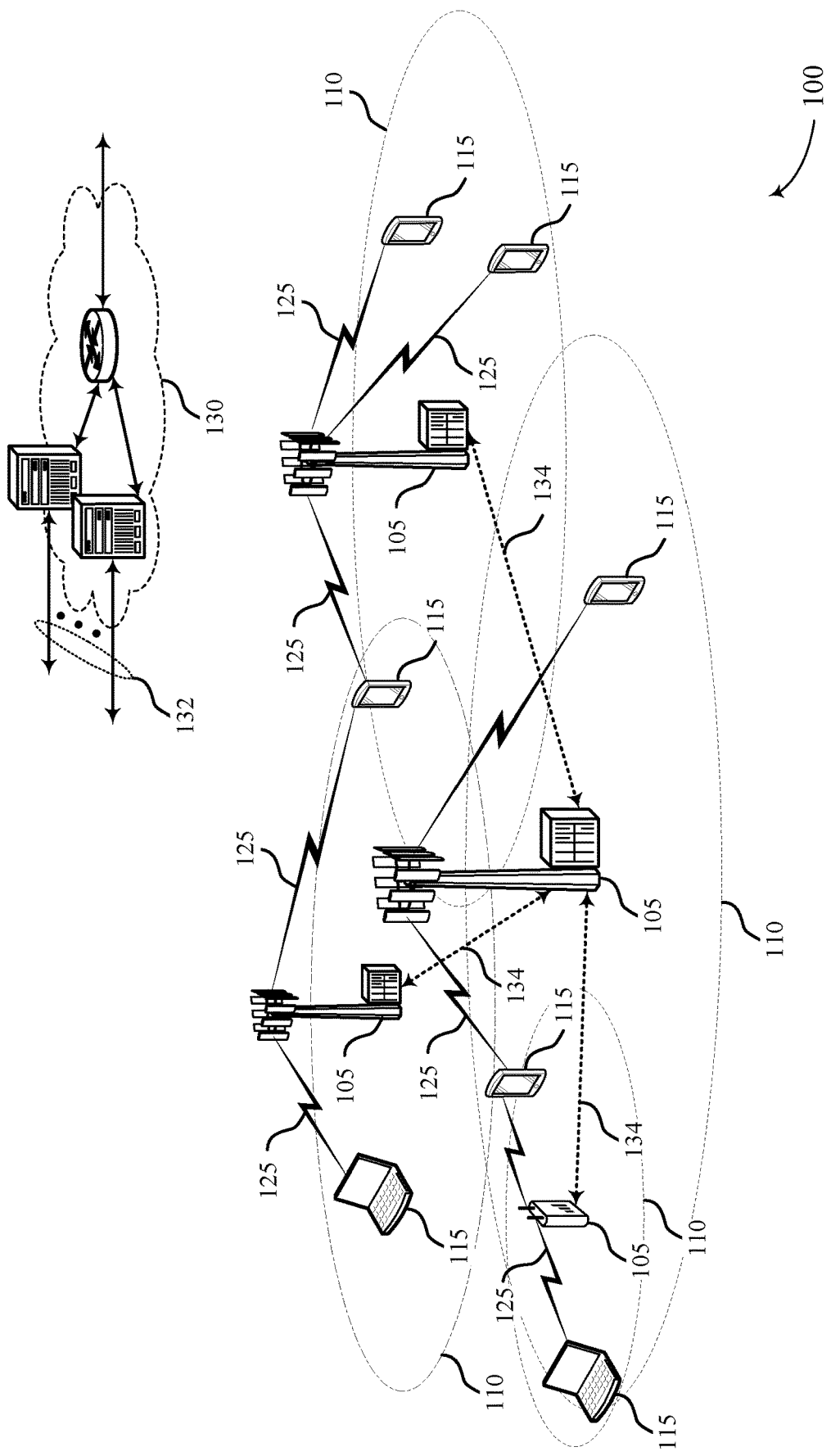
FIG. 1 illustrates an example of a wireless communications system in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

In some aspects, wireless communication systems may support a first set of preconfigured resources that are allocated to nodes to perform a certain type of communication procedure, e.g., access communications. Broadly, the resources of the first set of resources may refer to any combination of time, frequency, code, or space resources. In some examples, the first set of resources may only occupy part of the bandwidth and/or may have an associated spatial configuration that limits the coverage area that the resources can be used. In some aspects, a first type of communication procedure may dictate a pattern of communication states (e.g., a temporal pattern of communication states) for each node within the first set of resources under half-duplex constraint. Generally, a half-duplex constraint may refer to a node that cannot transmit and receive at the same time over the same band. In some examples, a communication state may refer to a transmitting state (or mode), a receiving state (or mode), or an idle state (or mode). In further examples, a communication state may refer to a flexible state (or mode) where the flexible stat is an undecided communication state regarding a transmitting state, receiving state, or the like. The flexible state may indicate that the state (or mode) is undecided at the time the temporal patter is determined and can be converted to a different mode (e.g., transmitting state or receiving state) at a later time. Each communication state may be for a given time unit and, in some examples, may follow a pattern over multiple time units. The time unit may refer to a symbol, or a slot, or a mini-slot, and the like. The pattern may be periodic, or pseudo-random, or generated based on an algorithm. Each node within the network may have a different pattern of communication states. However, the resources in the first set of resources may not occupy the full bandwidth and/or may be limited in the spatial domain for a given time unit. In some examples this may result in waste in that not all available resources are being used for one or more timer units.

Aspects of the disclosure are initially described in the context of a wireless communications system. Aspects of the present disclosure provide for a first node (e.g., a scheduled node) to transmit an indication of a temporal pattern of communication states for the first node. In some aspects, the temporal pattern of communication states for the first node may refer to, for a given time unit, whether the first node is configured for uplink communications, downlink communications, or is in an idle mode. Generally, the temporal pattern of communication states may be for communications by the first node on a first set of resources, with the first node being configured for half-duplex communications (e.g., the first node may be half-duplex constrained). The first node may transmit the indication of the temporal pattern of communication states to a second node (e.g., a scheduling node).

In some aspects, the second node may receive the indication from the first node (or otherwise identify the temporal pattern of communication states of the first node) and also identify its own temporal pattern of communication states for communications using the first set of resources. Based on the temporal pattern of communication states for the first node and the second node, the second node may determine a schedule for communicating with the first node on a second set of resources that are multiplexed with the first set of resources. In some aspects, the first and second set of resources may be multiplexed in a frequency domain (e.g., when the first set of resources did not occupy the full available bandwidth during the time unit) and/or in a spatial domain. The second node may transmit a grant of resources for communications via the second set of resources to the first node, and the first and second nodes may perform communications according to the schedule and using the second set of resources. In some aspects, the communications according to the schedule and using the second set of resources may refer to access communications and/or backhaul communications, such as an integrated access backhaul (IAB) network.

Aspects of the disclosure are further illustrated by and described with reference to apparatus diagrams, system diagrams, and flowcharts that relate to scheduling over multiplexed resources under half-duplex constraint.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a scheduled node (which may be an example of an AN, a base station 105, and/or a UE 115) may transmit an indication of a first temporal pattern of communication states for communications by the scheduled node on a first set of resources. The scheduled node may transmit the indication to a scheduling node in the network. In some aspects, the scheduled node may be configured for half-duplex communications. The scheduled node may receive, in response to the indication, a grant of resources for performing communications on a second set of resources that are multiplexed with the first set of resources. In some aspects, the first set of resources in the second set of resources may be multiplexed in a frequency domain and/or spatial domain.

In some aspects, a scheduling node (which may be an example of an AN, a base station 105, and/or a UE 115) may identify a first temporal pattern of communication states for communication by a scheduled node in the network on a first set of resources. The scheduling node may be configured for half-duplex communications. The scheduling node may identify a second temporal pattern of communication states for communications on the first set of resources by the scheduling node. The scheduling node may determine, based on the first and second temporal patterns of communication states, a schedule for communicating with the first node (e.g., the scheduled node) on a second set of resources that are multiplexed with the first set of resources. In some aspects, the first and second set of resources may be multiplexed in a frequency domain and/or spatial domain. The scheduling node may transmit, to the scheduled node, a grant of resources for communications via the second set of resources in accordance with the schedule.

Figure 2:
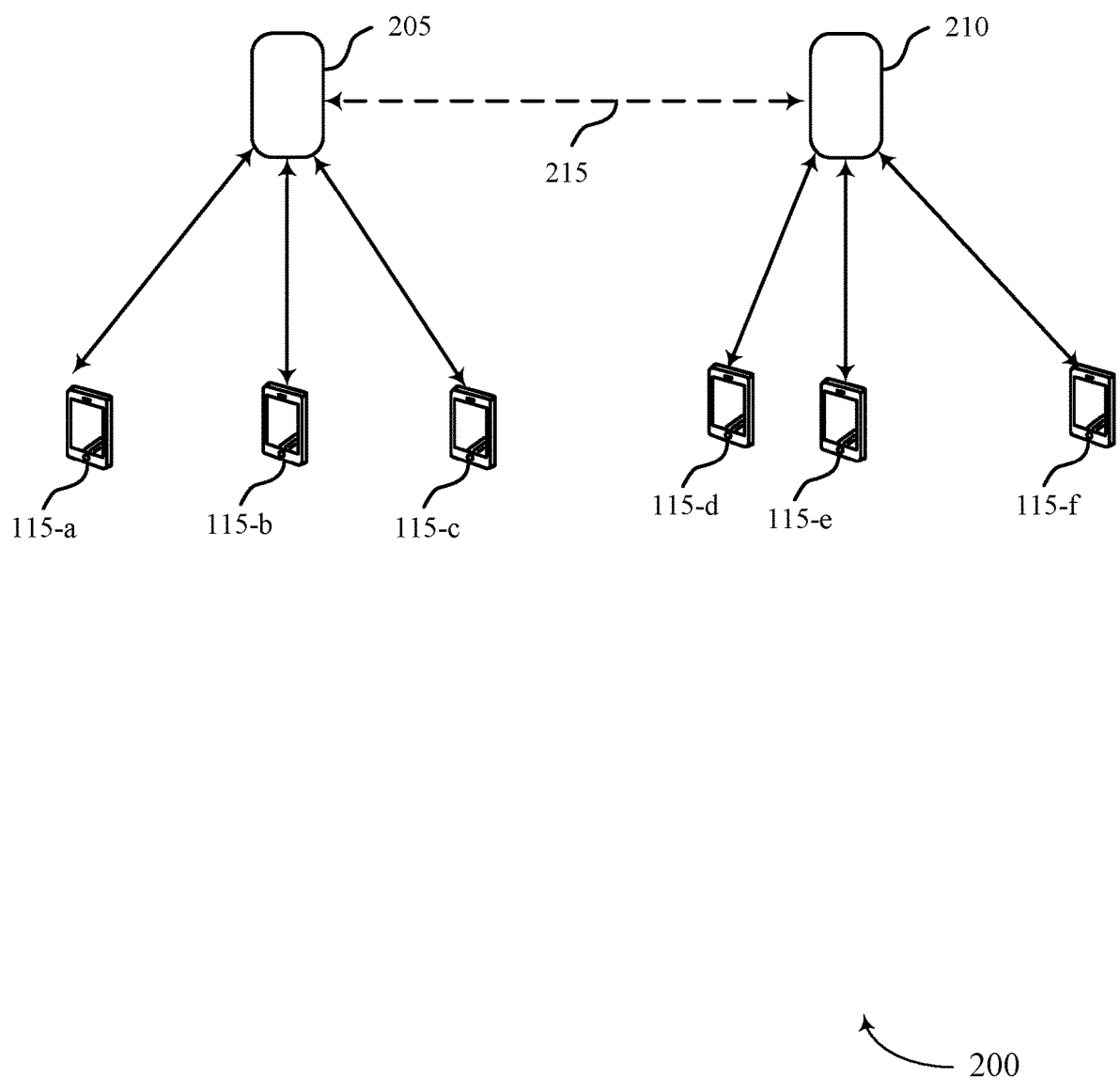
FIG. 2 illustrates an example of a wireless communication system in accordance with aspects of the present disclosure.

FIG. 2 illustrates an example of a wireless communication system 200 in accordance with aspects of the present disclosure. In some examples, wireless communication system 200 may implement aspects of wireless communication system 100. Aspects of wireless communication system 200 may include a scheduling node 205 and a scheduled node 210, each of which may be in communication with one or more UEs 115. In some aspects, scheduling node 205 and/or scheduled node 210 may be examples of an AN, a base station, and/or a UE, which may be examples of corresponding devices described herein. In some examples, wireless communication system 200 may be a mmW network, an IAB network, or the like.

Broadly, scheduling node 205 and/or scheduled node 210 may be configured to perform communications with one or more UEs 115 using a first set of resources. In the example wireless communication system 200, scheduled node 210 may use the first set of resources for performing communications with UE 115-d, 115-e, and/or 115-f. Similarly, scheduling node 205 may use the first set of resources for performing communications with UE 115-a, at 115-b, and/or 115-c. In some aspects, scheduling node 205 and/or scheduled node 210 may be configured for half-duplex communications. This may refer to scheduling node 205 and/or scheduled node 210 only being able to transmit or receive during a particular time period over a channel. In some examples, this may also be referred to as being half-duplex constrained.

Generally, references to a scheduling node or a scheduled node may simply refer to which node wishes to schedule communications with another node using a second set of resources that are multiplexed with the first set of resources. Accordingly, either node in the network may be considered a scheduling node 205 in some examples, and a scheduled node 210 in other examples.

Generally, communications using the first set of resources may be associated with a temporal pattern of communication states for each of scheduling node 205 and scheduled node 210. In some aspects, the communication states may refer to an uplink state, a downlink state, an idle state, or a flexible state. The uplink state may refer to the situation where scheduled node 210 transmits uplink information during a transmit mode of the first set of resources and scheduling node 205 receives the uplink information during a receive mode, or vice versa. A downlink state may refer to the situation where scheduling node 205 transmits downlink information during a transmit mode of the first set of resources and scheduled node 210 receives the downlink communications during a receive mode of the first set of resources, or vice versa. An idle state may refer to the situation where scheduling node 205 and/or scheduled node 210 are configured to be in an idle mode and/or configured for an unknown communication direction during the time unit. A flexible state may refer to a situation in which the communication state (e.g., downlink or uplink) is undecided at the time of determination of the temporal pattern. The flexible communication state may be converted to an uplink state or a downlink state at a later point. In some aspects, each communications state may be for a regular time unit or time period, which may be an example of a symbol, a mini-slot, a slot, and the like.

In some aspects, the first set of resources may not necessarily use all of the available resources. As one example, the first set of resources may only use a portion of the bandwidth that is available for communicating during a particular time unit. As another example, the first set of resources may have a spatial component to them such that, for a given time unit, the node is transmitting and/or receiving in a particular direction, such that other directions are not being utilized for communications. Accordingly, in some aspects wireless communication system 200 may be configured to support scheduling of multiplexed resources by scheduling node 205 and/or scheduled node 210 in accordance with the described techniques using a second set of resources.

For example, scheduling node 205 (which may also be referred to as a second node) may identify a first temporal pattern of communication states for communications by the scheduled node 210 (which may also be referred to as a first node) in the network using the first set of resources. In some examples, this may include scheduled node 210 transmitting a signal to scheduling node 205 that provides an indication of the first temporal pattern of communication states for scheduled node 210. In other examples, scheduling node 205 may determine or otherwise identify the first temporal pattern of communication states in other ways. For example, in some scenarios scheduling node 205 may be the node that actually schedules the first set of resources, and therefore may identify the first temporal pattern of communication states based on the fact that it has configured the first set of resources for scheduled node 210. In another example, scheduling node 205 may determine or otherwise identify the first temporal pattern of communication states for scheduled node 210 based on receiving a signal from another device, e.g., a base station or other network entity that is responsible for configuring the first set of resources. In this example, scheduling node 205 may intercept the signal (e.g., the grant of the first resources to scheduled node 210) and determine the first temporal pattern of communication states based on the intercepted signal. Some examples, the first temporal pattern of communication states may be associated with a slot format indicator (SFI) of scheduled node 210.

In some aspects, scheduling node 205 may also identify a second temporal pattern of communication states for communicating on the first set of resources by scheduling node 205. For example, scheduling node 205 may receive a grant of resources for the first set of resources that carries or otherwise conveys an indication of the second temporal pattern of communication states that scheduling node 205 may use for communicating with one or more of UEs 115.

In some aspects, scheduling node 205 or the scheduled node 210 may be in a flexible state for communicating on a set of resources with respect to the first or second temporal patterns of communications states. If either of the scheduling node 205 or the scheduled node 210 are in a flexible state for the first resource, then a communication state may not be scheduled for the second resource by the scheduling node 205.

Based on the first temporal pattern of communication states for scheduled node 210 and the second temporal pattern of communication states for scheduling node 205, scheduling node 205 may determine a schedule for communicating with scheduled node on a second set of resources that are multiplexed with the first set of resources in a frequency domain and/or spatial domain. For example, scheduling node 205 may identify a portion of an available bandwidth that is not being utilized in the first set of resources during the time unit and therefore identify which frequencies are available for the second set of resources during the time period or unit. As another example, scheduling node 205 may identify a spatial component that is not being used in the first set of resources for a particular time period and therefore identify which spatial domain is available for the second set of resources for the time period. In some aspects, scheduling node 205 may identify both the frequency domain component and a spatial domain component available for the second set of resources to use for communicating with scheduled node 210.

In some examples, scheduling node 205 may receive a signal (e.g., from a base station or other network entity or other node) that provides or otherwise conveys an indication of the first set of resources and/or the second set of resources. In some examples, this may include the signal identifying the first set of resources and scheduling node 205 identifying the second set of resources based on the first set of resources. In other examples, this may include the signal identifying both the first set of resources and the second set of resources.

Scheduling node 205 may transmit a grant of resources to scheduled node 210, with the resources to be used for communications via the second set of resources in accordance with the schedule. For example, the grant may be carried in a control signal from scheduling node 205 to scheduled node 210 that carries or otherwise conveys the indication of the grant of resources from the second set of resources. Accordingly, the scheduling node 205 and the scheduled node 210 may perform wireless communications using the grant of resources from the second set of resources according to the schedule. In some examples, the communications between the scheduling node 205 and the scheduled node 210 using the second set of resources may be access communications and/or backhaul communications. In one example, wireless communication system 200 may be a mmW network, an IAB network, and the like, with the nodes of the network using the described techniques to perform backhaul operations and/or access communications. In one example, where the network is an IAB network, the first set of resources may be associated with or otherwise used for inter-relay discovery communications within that IAB network.

Thus, in some aspects of the described techniques each node determines its temporal pattern of communication states over the first resource set. In some examples, the scheduling node 205 may collect the temporal pattern of communication states from scheduled node 210. The scheduling node 205 may make constrained scheduling decisions over the second resource set, that is frequency and/or spatial multiplexed with first resource set, based on the communication states of itself and the scheduled node 210 that comply with half-duplex constraint. For a given time unit, if both the scheduling node 205 and the scheduled node 210 are both at transmit or receive communication states, no communication can be scheduled over the second resource set at that time unit. For a given time unit, if both the scheduling node 205 and the scheduled node 210 are at an idle mode communication state, the scheduling node 205 can make any scheduling decision over second resource set at that time unit. For a given time unit, if the scheduling node 205 is at a transmit mode and the scheduled node 210 is at receive or idle mode, the scheduling node 205 may schedule a downlink transmission over the second resource set at that time unit. For a given time unit, if the scheduling node 205 is at a receive mode and the scheduled node 210 is at a transmit or idle mode, the scheduling node 205 may schedule an uplink transmission over the second resource set at that time unit. In some aspects, if either the scheduled node or the scheduling node is in a flexible state for the first set of resources associated with a temporal pattern of communication states, no communication will be scheduled for a second set of resources by the scheduling node 205.

Figure 3:
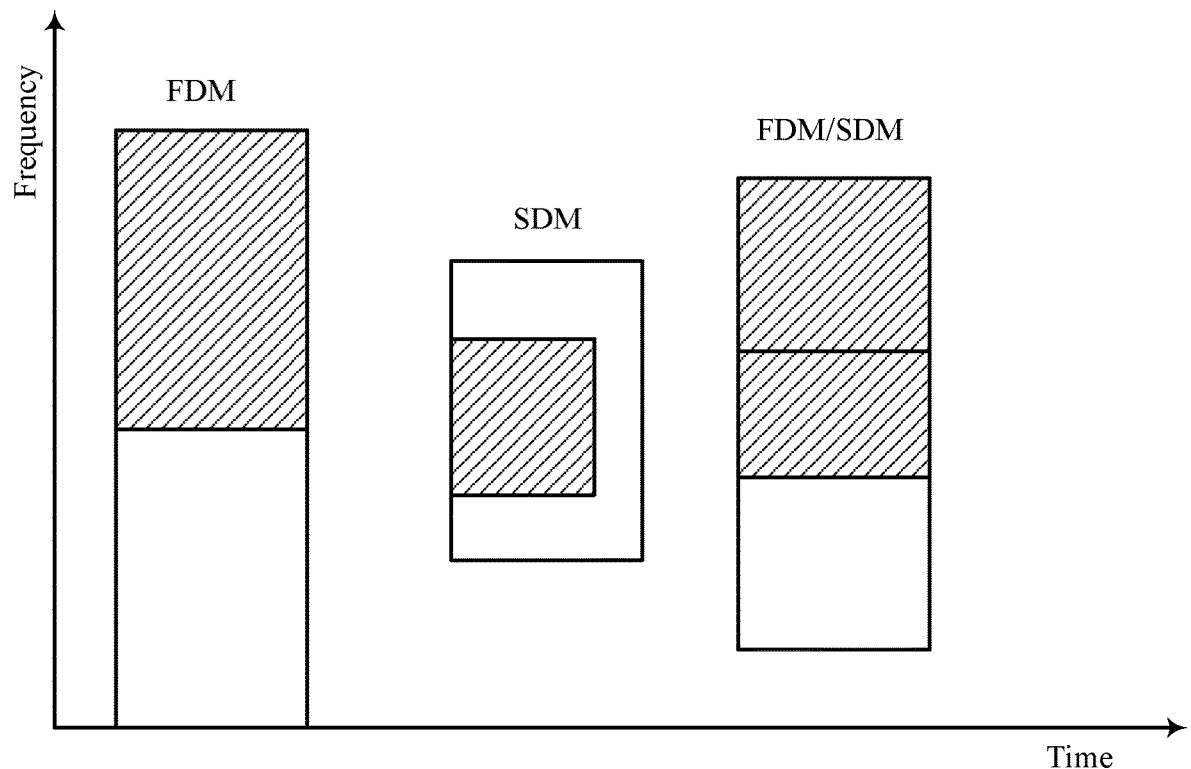
FIG. 3 illustrates an example of a multiplexed resource configuration that supports scheduling over multiplexed resources under half-duplex constraint in accordance with aspects of the present disclosure.
Figure 3:
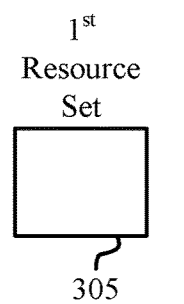
Figure 3:
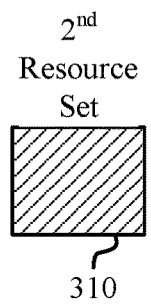

FIG. 3 illustrates an example of a multiplexed resource configuration 300 that supports scheduling over multiplexed resources under half-duplex constraint in accordance with aspects of the present disclosure. In some examples, multiplexed resource configuration 300 may implement aspects of wireless communication systems 100 or 200. Aspects of multiplexed resource configuration 300 may be implemented by a scheduling node and/or a scheduled mode, which may be examples of a base station, a UE, and/or an access node, as described herein.

Generally, multiplexed resource configuration 300 may include a first set of resources 305 and a second set of resources 310. The first set of resources 305 may also be referred to as a first resource set 305 and the second set of resources 310 may also be referred to as a second resource set 310. In some aspects, the first set of resources 305 and/or the second set of resources 310 may refer to time/frequency/spatial resources, where the first set of resources 305 are multiplexed with respect to the second set of resources 310 in at least the frequency and/or spatial domain.

In one example, (on the left side of the graph), the first set of resources 305 are multiplexed in the frequency domain with respect to the second set of resources 310. Accordingly, the frequencies in the first set of resources 305 do not overlap with respect to the frequencies in the second set of resources 310.

In another example, (in the middle of the graph), the first set of resources 305 are multiplexed in the spatial domain with respect to the second set of resources 310. Accordingly, the first set of resources 305 may be used for communications in a first space while the second set of resources 310 are being used for communications in a second space. Generally, the first space and the second space may not overlap, such that the communications in the first set of resources 305 do not interfere with the communications in the second set of resources 310.

In another example, (on the right side of graph), the first set of resources 305 are multiplexed in both the frequency domain and the spatial domain with respect to the second set of resources 310. For example, and for a given time unit, some frequencies may overlap between the first and second set of resources, but the communications may not overlap in the spatial domain. In another example, and for a given time unit, some spatial domain components of the first and second set of resources may overlap, but the communications may not overlap in the frequency domain.

In some aspects, various nodes of a network may be configured with the first set of resources 305. For example, the first set of resources 305 may be configured for the nodes to perform access communications and/or backhaul communications in the network. However, in some examples the first set of resources 305 do not completely utilize all available resources (e.g., may not use the full bandwidth, such as in the first example, may not use the full spatial domain, such as in the second example, or both). Accordingly, some nodes of the network may be configured to schedule communications using the second set of resources 310 in accordance with the described techniques. For example, a scheduling node may transmit a request to a scheduled node to determine the temporal pattern of communication states for communications by the scheduled node on the first set of resources 305. The scheduled node may be configured for half-duplex communications. In response, the scheduled node may transmit a signal that carries or otherwise provides an indication of the temporal pattern of communication states for the scheduled node on the first set of resources 305. In other examples, the request/response exchange may not occur and, instead, the scheduling node may determine or otherwise identify the temporal pattern of communication states for communications by the scheduled node on the first set of resources using other techniques, e.g., such as by receiving a signal from a base station or other network entity that indicates the temporal pattern of communication states for communication by the scheduled node on the first set of resources 305. In some examples, the scheduling node may be the node that actually configures the temporal pattern of communication states for the scheduled mode, and may therefore already know this information.

In some aspects, the scheduling node may also identify its own temporal pattern of communication states for communications by the scheduling node on the first set of resources 305. For example, the scheduling node may be configured (e.g., by a network entity or other entity or other node) with the first set of resources 305.

Based on the temporal patterns of communication states of the scheduling node and the scheduled node, the scheduling node may determine a schedule for communicating with the first node in the second set of resources 310 that are multiplexed with the first set of resources 305 in the frequency domain and/or spatial domain, such as is illustrated in multiplexed resource configuration 300. The scheduling node may transmit a grant of resources for communicating via the second set of resources 310 in accordance with the communication schedule. Accordingly, the scheduling node and the scheduled node may perform communication's using the second set of resources 310 according to the communication schedule. In some aspects, the communications using a second set of resources may be backhaul communications and/or access communications. In some examples of the network being an IAB network, the first set of resources 305 may be used for inter-relay discovery procedures in the IAB network, and the second set of resources 310 may be used for other communications (e.g., access communications and/or other backhaul communications).

Figure 4:
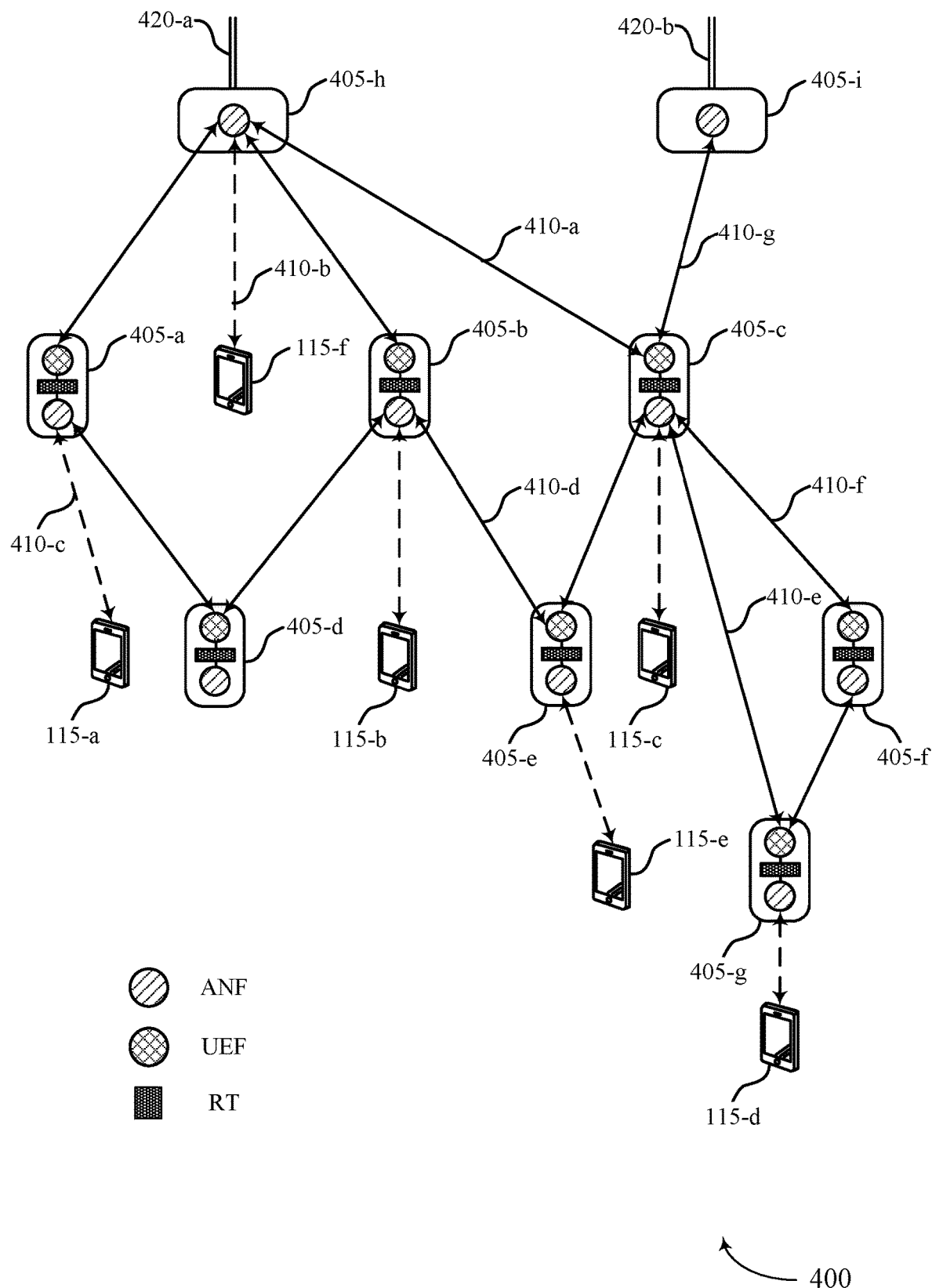
FIG. 4 illustrates an example of an integrated access and backhaul (IAB) network that supports scheduling over multiplexed resources under half-duplex constraint in accordance with aspects of the present disclosure.

FIG. 4 illustrates an example of an IAB network 400 that supports scheduling over multiplexed resources under half-duplex constraint in accordance with aspects of the present disclosure. In some examples, IAB network 400 may implement aspects of wireless communication systems 100, 200, and/or multiplexed resource configuration 300. In some cases, the IAB network 400 may be an example of a wireless communications network that operates in mmW spectrum, or supports 5G NR deployments.

In some wireless communications systems, such as those deploying NR technologies, wireless backhaul links may be used to couple an AN to a network in place of high-capacity, wired backhaul link (e.g., fiber). For example, a first AN (e.g., relay node) in communication with a UE, or another AN, may establish a backhaul link (wired or wireless) with a second AN (e.g., anchor), which has a high-capacity, wired backhaul link to the network. In this manner, the first AN may communicate access traffic from the UE (or another AN) to the network via the second AN through the combination of the one or more backhaul links. In some examples, a backhaul network may use multiple backhaul links before reaching a wired backhaul link. The first AN may be referred to as a UE-Function (UEF) with respect to the anchor and an Access Node Function (ANF) with respect to the UE (or another AN) with which the first AN is communicating. Thus, a relay node may act as a UE for its one or more parent relays (e.g., relays that connect the relay node one hop closer to the anchor) and as a base station for its child relays and/or UEs within its coverage area.

In some examples, the backhaul network may provide robustness via topological redundancy, for example, by providing alternate paths for traffic to travel (e.g., in case of broken communication links). In such an ad-hoc network, large-scale resource coordination schemes may serve to optimize communications between UEs and the network. In some aspects, resources available for communication may be dynamically allocated to the backhaul and access links. Further, the resources may refer to any combination of time, frequency, code, or space. In some cases, wireless communications systems may deploy one or more techniques to support coordination of signaling and resource allocation for wireless backhaul networks in order to support IAB.

Turning to IAB network 400, the IAB network 400 may include a number of ANs 405 (ANs 405-*a*, 405-*b*, 405-*c*, etc.) and UEs 115 that communicate over a combination of wired links 420 (e.g., wired links 420-*a* and 420-*b*) and wireless links 410. In some cases, the wired links 420 may be core network links, and may connect anchor ANs 405-*h* and 405-*i* to the core network (e.g., core network 130 of FIG. 1). The ANs 405 may be examples of the scheduling node and/or the scheduled node, as is described herein.

In some examples, complex backhaul topologies may be handled by composing the topology from multiple stars that mutually overlap. For instance, IAB network 400 may include a mesh topology with at least two interfaces to a wireline network. Additional ANs 405 may be either directly or indirectly coupled to the respective interfaces of the mesh topology via wireless links 410 (e.g., wireless link 410-*a*). Such a topology may include multiple stars, where some stars mutually overlap. An ANF may be supported by an AN 405 of the mesh topology (e.g., ANs 405-*b*, 405-*h*, 405-*i*, etc.). UEF functionality may be configured at some or all of the ANs 405 of the IAB network 400. As a result, an AN 405 may include multiple ANFs and UEFs configured for uplink and downlink data packet transmission according to an active mode or a suspended mode using the node functions.

In some cases, each of the one or more wireless links 410 may be associated with wireless resources, establishing resource functionality for access and backhaul traffic within the mesh topology. For example, AN 405-*b* may include one or more instances of a UEF, where it may communicate with the ANFs at ANs 405-*h*, 405-*d*, and 405-*e*. In some cases, ANs 405 may each communicate with each other using at least one ANF and at least one UEF, and may form overlapping stars. Wireless links may be associated with a first set of resources, where the resources are configured by the ANFs and/or a network entity, such as a base station. Multiple stars may use techniques to coordinate wireless resources, which may efficiently handle system constraints such as half-duplexed communications, inter-link interference, etc. In some examples, an AN 405 may also include a routing table (RT), which may be used in the determination of a location for packets to be directed. Each AN 405 may further include a relay functionality, where a given AN 405 may relay transmissions between ANs 405, for example, from a UE 115 to another AN 405, such as AN 405-*e* supporting communication between the network and UE 115-*e* via AN 405-*b*.

Additionally or alternatively, mobile access may be integrated at one or more ANs 405. Each AN 405 of the integrated mobile access may be configured to form a star topology with UEs 115. For example, AN 405-*a* may correspond to a center of a star topology of integrated mobile access within the network. One or more UEs 115-*a* may be coupled to AN 405-*a* via one or more wireless links (e.g., wireless link 410-*c*). In some examples, mobile access links may also be added to existing stars. In an example, AN 405-*c* may communicate with AN 405-*h* using wireless link 410-*a*. AN 405-*g* may further communicate with UE 115-*d* and AN 405-*c* over wireless links 410 (e.g., wireless link 410-*e*). In this example, wireless links 410-*a* and 410-*e* both share the same first set of wireless resources to provide support for IAB. In some cases, a range of ANF and UEF combinations may be instantiated in an AN 405. Additional or different combinations of UEF and ANF instances in ANs 405, as well as different topologies not shown in FIG. 4, may be possible.

The ANF and UEF configurations of the ANs 405 may be assigned the same functionalities and signaling protocols for resource allocation. That is, resource coordination of the one or more star topologies contained within the mesh topology may be managed via the radio access technology (RAT), such as a mmW RAT. Further, wireless resource use among ANs 405 within a star may be coordinated via a large-scale (e.g., network-wide) schedule. Within each star, signaling and resource management may be regulated by the RAT and a resource sub-schedule may be generated by a star's ANF. Each wireless link 410 may be coordinated using time synchronization, e.g., with a frame structure supported by the RAT. ANs 405 may use a routing function that makes decisions on forwarding of data among node functions residing on the same node. The routing function may be executed or instantiated, for example, on any one of a number of protocol layers (e.g., the routing function may be executed on an IP layer). In some cases, the AN 405 may access an RT, and may forward data between node functions based on the RT. Additionally or alternatively, a routing function or an RT may be used to forward data between different ANs 405.

In some examples, a large-scale or network-wide TDM scheduling (e.g., a super schedule) may be used to assign a first set of resources to the various ANs 405 in a coordinated manner. For example, adjacent stars (e.g., different stars with leaves that share at least one node) or overlapping stars (e.g., stars with one common leaves) may use the first set of wireless resources. The schedule may be followed by all participating ANs 405 through a mutual time synchronization and the frame structure, which may be defined by the RAT.

In some cases, the resource allocation of the first set of resources may be determined using one or more schemes. In a first example scheme, resource allocation may be determined by a centralized scheduler (e.g., system wide), which may be referred to as a centralized scheme. In some other cases, a distributed scheme may be implemented, where one or more ANs 405 may exchange signaling, and resource allocation may be determined based on the exchanged signaling. Signaling may include requests from an AN 405 to the scheduler or to other ANs 405. In other cases, signaling may involve one or more ANs 405 exchanging various messages, measurements, or reports such as buffer status reports (BSRs), channel quality, beam quality, and/or interference measurements and reports. Additionally or alternatively, signaling may include a resource configuration from the scheduler or an AN 405 to one or more other ANs 405, or an indication of the resource configuration from an AN 405 to one or more UEs 115 in the same cell, or neighboring cell. In some cases, resource allocation determination may be preconfigured, for example.

In some examples, one or more of the ANs 405 may act as a scheduling node and/or a scheduled node that use resources in a second set of resources for communications, where the second set of resources are multiplexed in a frequency domain and/or spatial domain with the first set of resources. For example, an AN 405 may act as a scheduling node when it generates a resource configuration and grants resources in the second set a resources to use for communications between the scheduling node of the scheduled node. An AN 405 may act as a scheduled node when it receives a grant of resources in the second set of resources to use for communications between the scheduled node and the scheduling node.

In some aspects, the scheduled node may transmit a signal to the scheduling node that carries or otherwise provides an indication of the first temporal pattern of communication states for communication by the scheduled node on the first set of resources. The scheduling node may identify its own temporal pattern of communication states for communication by the scheduling node on the first set of resources. The scheduling node may determine, based on the temporal patterns of communication states of the scheduling node and the scheduled node, a schedule for communicating with the scheduled node on a second set of resources that are multiplexed with the first set of resources in a frequency domain and/or a spatial domain. The scheduling node may transmit a grant of resources to the scheduled node, where the resources are from the second set of resources and are used for communications between the scheduling node and the scheduled node.

In some aspects, the first set of resources are allocated for access links. In some aspects, the second set of resources may be used for backhaul links between nodes of the IAB network 400.

In some aspects, one type of communications performed by an IAB-node (e.g., AN 405) that uses the first set of resources may be for an inter-relay discovery procedure. In IAB networks, each IAB-node (relay node) may need to discover its neighbor relay nodes using the inter-relay discovery procedure. With knowledge of neighboring nodes, a relay node may change its connection paths to the IAB-anchor node in the IAB networks when needed. For example, when its existing path is blocked, a relay node may connect to another relay node with better link quality. To support inter-relay discovery, the first set of resources, that may only occupy part of the available bandwidth, can be pre-allocated for each IAB-node. Over this first set of resources, each IAB-node may determine a pattern to either transmit or monitor the inter-relay discovery signal. The pattern can be determined randomly, or based on an algorithm, e.g., based on the number of hops to the IAB-anchor or another IAB-node that provides the synchronization source. Different patterns may result in different communication states among IAB-nodes. For example, node1 may follow a first temporal pattern of communication states (e.g., transmit, idle, receive, transmit, idle, receive) and node2 may follow a second temporal pattern of communication states (e.g., idle, receive, transmit, idle, receive, transmit). In some aspects, the second set of resources, which multiplexed in the frequency and/or spatial domain with the first set of resources, may be used for other purpose, e.g., data transmission. In order to make use of the second set of resources for data transmission, the scheduling node may schedule communications that are consistent with the temporal pattern of communication states of itself and the scheduled node.

Figure 5:
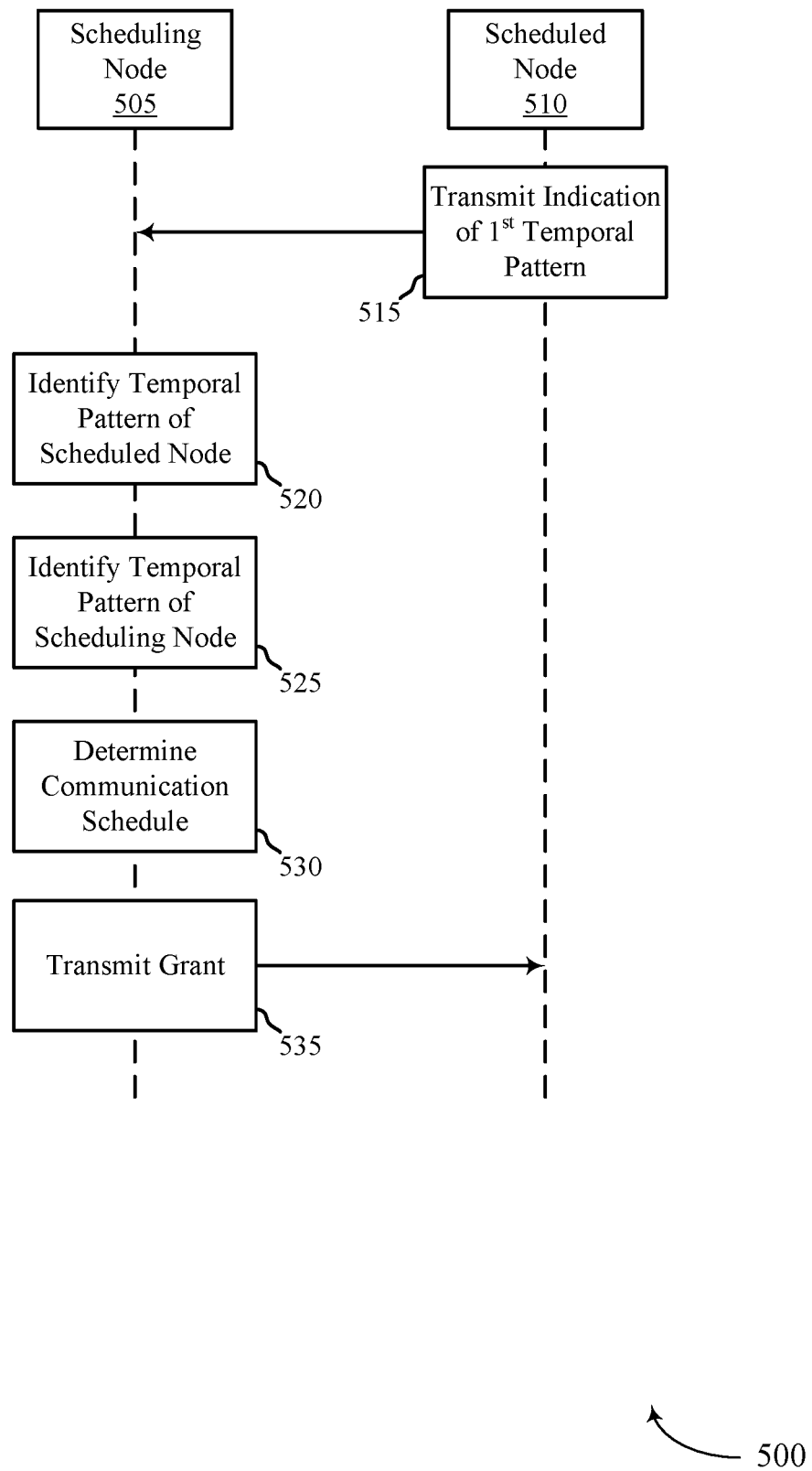
FIG. 5 illustrates an example of a process in accordance with aspects of the present disclosure.

FIG. 5 illustrates an example of a process 500 in accordance with aspects of the present disclosure. In some examples, process 500 may implement aspects of wireless communication systems 100/200, multiplexed resource configuration 300, and/or IAB network 400. In some aspects, process 500 may include a scheduling node 505 and a scheduled node 510, either of which may be examples of a UE, a base station, and/or an AN as is described herein. In some examples, scheduling node 505 and/or scheduled node 510 may be a part of an IAB network.

At 515, scheduled node 510 may transmit (and scheduling node 505 may receive) an indication of a first temporal pattern of communication states for communication by the first node on a first set of resources. In some aspects, the scheduled node 510 is configured for half-duplex communications. In some aspects, scheduled node 510 may transmit the indication in response to receiving a request for the first temporal pattern of communication states from scheduling node 505.

At 520, scheduling node 505 may identify the first temporal pattern of communication states of scheduled node 510. In some aspects, scheduling node 505 may identify the first temporal pattern of communication states based on scheduling node being the node that configures the scheduled node 510 for communications on the first set of resources.

At 525, scheduling node 505 may identify a second temporal pattern of communication states that the scheduling node 505 uses for communicating on the first set of resources. In some aspects, scheduling node 505 is also configured for half-duplex communications.

At 530, scheduling node 505 may determine, based on the first and second temporal patterns of communication states, a schedule for communicating with the scheduled node 510 on a second set of resources that are multiplexed with the first set of resources in a frequency domain and/or a spatial domain.

At 535, scheduling node 505 may transmit (and scheduled node 510 may receive) a grant of resources for communications via the second set of resources in accordance with the schedule. Accordingly, the scheduling node 505 and scheduled node 510 may perform communications using the second set of resources according to the communication schedule. In some aspects, the grant of resources may be based on the indication of the first temporal pattern of communication states received from scheduled node 510.

In some aspects, this may include scheduled node 510 performing at least one of receiving a downlink communication from scheduling node 505 or transmitting an uplink communications to scheduling node 505 during a time period that is associated with the scheduling node 505 and the scheduled node 510 being in an idle mode in accordance with the first and second temporal patterns of communication states. In some aspects, this may include scheduled node 510 receiving a downlink communication from scheduling node 505 during a time period that is associated with scheduled node 510 being in an idle mode or a receive mode in accordance with the first temporal pattern of communication states and the scheduling node 505 being in a transmit mode in accordance with the second temporal pattern of communication states. In some aspects, this may include scheduled node 510 transmitting an uplink communication to scheduling node 505 during a time period that is associated with the scheduled node 510 being in an idle mode or a transmit mode in accordance with the first temporal pattern of communication states and the scheduling node 505 being in an idle or receive mode in accordance with the second temporal pattern of communication states.

In some aspects, scheduled node 510 and/or scheduling node 505 may receive a signal that identifies the first set of resources and/or the second set of resources. In some aspects, the first set of resources may be associated with access communications and the second set of resources may be associated with a backhaul communications and/or access communications. In some examples, the second set of resources are associated with a backhaul communications in an IAB network, and the first temporal pattern of communication states is based on the inter-relay discovery communications in the IAB network.

Figure 6:
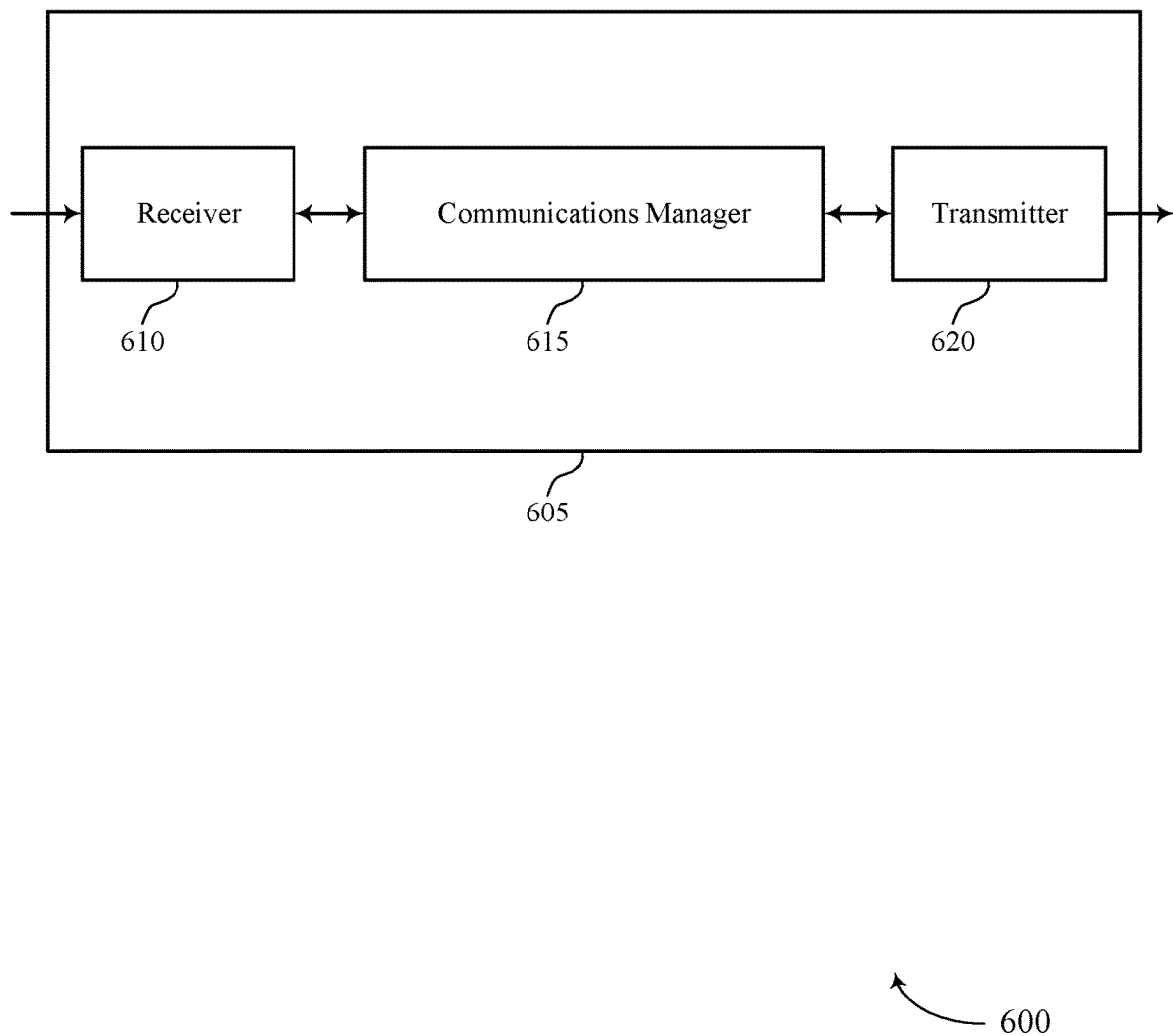
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115, a scheduling node, a scheduled node, an AN, or base station 105, as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to scheduling over multiplexed resources under half-duplex constraint, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

When configured as a scheduled node, the communications manager 615 may transmit, by a first node in the network and to a second node in the network, an indication of a first temporal pattern of communication states for communication by the first node on a first set of resources, the first node being configured for half-duplex communications. The communications manager 615 may also receive, from the second node, a grant of resources for performing communications on a second set of resources that are multiplexed with the first set of resources in a frequency domain, a spatial domain, or a combination thereof.

When configured as a scheduling node, the communications manager 615 may identify, at a second node in the network, a first temporal pattern of communication states for communication by a first node in the network on a first set of resources, the first node being configured for half-duplex communications. The communications manager 615 may also identify, at the second node in a network, a second temporal pattern of communication states for communicating on the first set of resources, the second node being configured for half-duplex communications. Additionally, the communications manager 615 may determine, based on the first and second temporal patterns of communication states, a schedule for communicating with the first node on a second set of resources that are multiplexed with the first set of resources in a frequency domain, a spatial domain, or a combination thereof. Further, the communications manager 615 may transmit, to the first node, a grant of resources for communications via the second set of resources in accordance with the schedule. The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
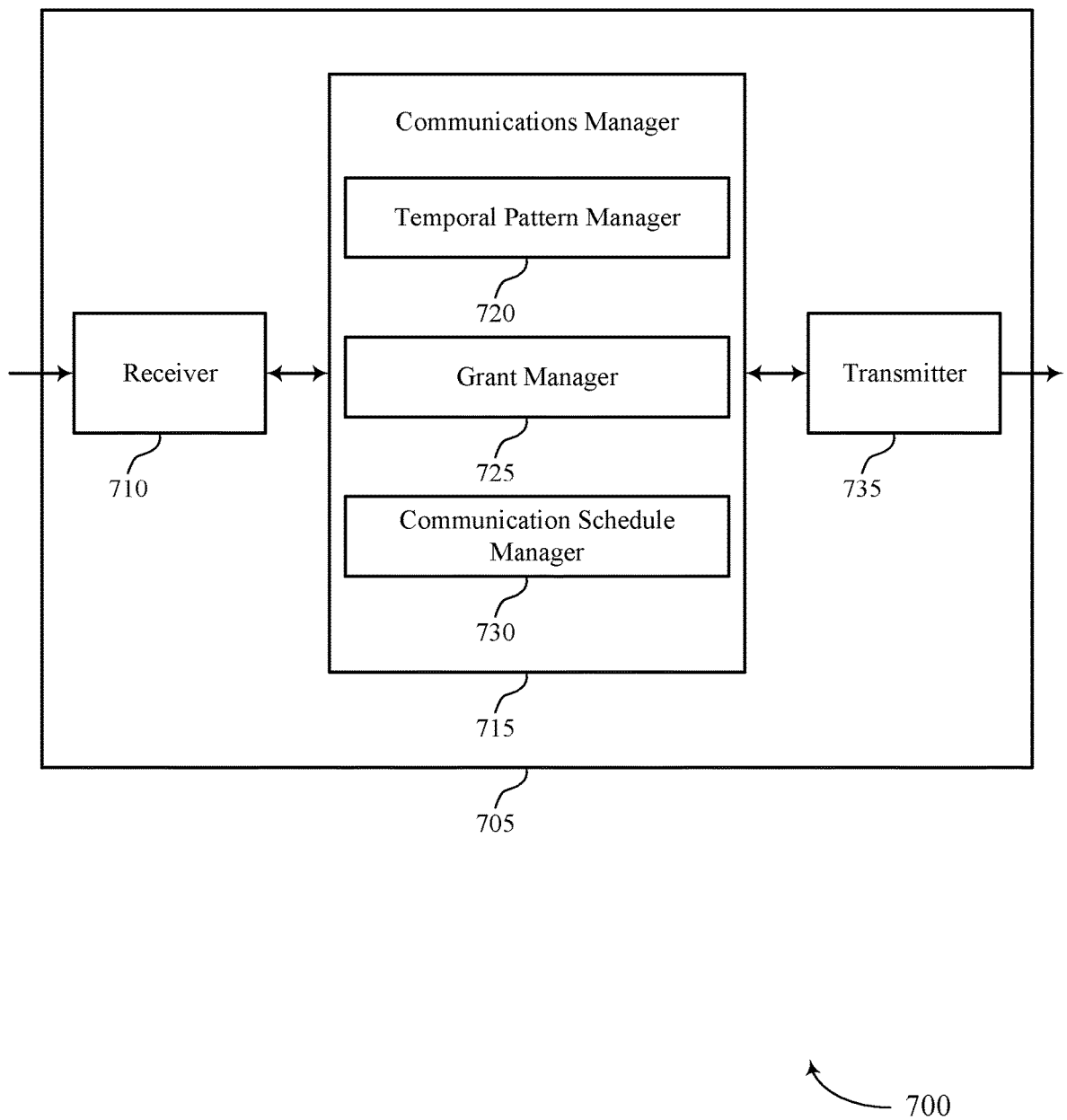

FIG. 7 shows a block diagram 700 of a device 705 in accordance with aspects of the present disclosure. The device 705 may be an example of aspects of a device 605, a UE 115, a scheduling node, a scheduled node, an AN, or a base station 105, as described herein. The device 705 may include a receiver 710, a communications manager 715, and a transmitter 735. The device 705 may also include a processor. Each of these components may be in communication with one another (e.g., via one or more buses).

Receiver 710 may receive information such as packets, user data, or control information associated with various information channels (e.g., control channels, data channels, and information related to scheduling over multiplexed resources under half-duplex constraint, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a temporal pattern manager 720, a grant manager 725, and a communication schedule manager 730. The communications manager 715 may be an example of aspects of the communications manager 910 or 1010 as described herein.

When the device 705 is configured as a scheduled node, the temporal pattern manager 720 may transmit, by a first node in the network and to a second node in the network, an indication of a first temporal pattern of communication states for communication by the first node on a first set of resources, the first node being configured for half-duplex communications.

When the device 705 is configured as a scheduled node, the grant manager 725 may receive, from the second node, a grant of resources for performing communications on a second set of resources that are multiplexed with the first set of resources in a frequency domain, a spatial domain, or a combination thereof.

When the device 705 is configured as a scheduling node, the temporal pattern manager 720 may identify, at a second node in the network, a first temporal pattern of communication states for communication by a first node in the network on a first set of resources, the first node being configured for half-duplex communications and identify, at the second node in a network, a second temporal pattern of communication states for communicating on the first set of resources, the second node being configured for half-duplex communications.

When the device 705 is configured as a scheduling node, the communication schedule manager 730 may determine, based on the first and second temporal patterns of communication states, a schedule for communicating with the first node on a second set of resources that are multiplexed with the first set of resources in a frequency domain, a spatial domain, or a combination thereof.

When the device 705 is configured as a scheduling node, the grant manager 725 may transmit, to the first node, a grant of resources for communications via the second set of resources in accordance with the schedule.

Transmitter 735 may transmit signals generated by other components of the device 705. In some examples, the transmitter 735 may be collocated with a receiver 710 in a transceiver module. For example, the transmitter 735 may be an example of aspects of the transceiver 920 or 1020 as described with reference to FIGS. 9 and 10. The transmitter 735 may utilize a single antenna or a set of antennas.

Figure 8:
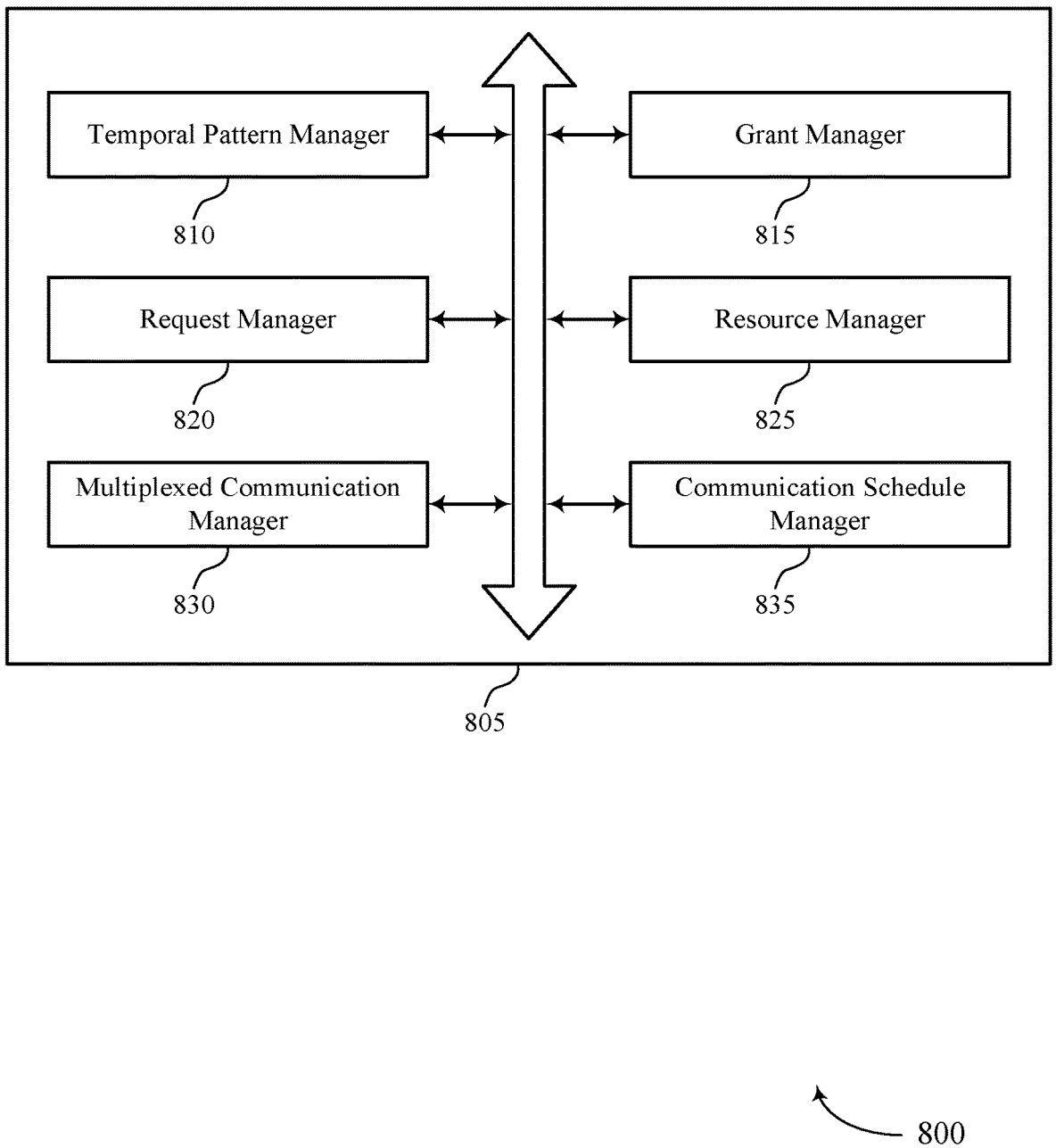
FIG. 8 shows a block diagram of a device in accordance with aspects of the present disclosure.

FIG. 8 shows a block diagram 800 of a communications manager 805 in accordance with aspects of the present disclosure. The communications manager 805 may be an example of aspects of a communications manager 615, a communications manager 715, or a communications manager 910 described herein. The communications manager 805 may include a temporal pattern manager 810, a grant manager 815, a request manager 820, a resource manager 825, a multiplexed communication manager 830, and a communication schedule manager 835. Each of these modules may communicate, directly or indirectly, with one another (e.g., via one or more buses).

When the device 705, with communications manager 805, is configured as a scheduled node, the temporal pattern manager 810 may transmit, by a first node in the network and to a second node in the network, an indication of a first temporal pattern of communication states for communication by the first node on a first set of resources, the first node being configured for half-duplex communications.

In some examples when the device 705, with communications manager 805, is configured as a scheduling node, the temporal pattern manager 810 may identify, at a second node in the network, a first temporal pattern of communication states for communication by a first node in the network on a first set of resources, the first node being configured for half-duplex communications.

In some examples when the device 705, with communications manager 805, is configured as a scheduling node, the temporal pattern manager 810 may identify, at the second node in a network, a second temporal pattern of communication states for communicating on the first set of resources, the second node being configured for half-duplex communications.

When the device 705, with communications manager 805, is configured as a scheduled node, the grant manager 815 may receive, from the second node, a grant of resources for performing communications on a second set of resources that are multiplexed with the first set of resources in a frequency domain, a spatial domain, or a combination thereof.

In some examples when the device 705, with communications manager 805, is configured as a scheduling node, the grant manager 815 may transmit, to the first node, a grant of resources for communications via the second set of resources in accordance with the schedule. In some cases, the grant of resources is based on the indication. In some cases, the grant of resources is for performing communications with the second node. In some cases, the grant of resources is for communications between the first node and the second node.

When the device 705, with communications manager 805, is configured as a scheduling node, the communication schedule manager 835 may determine, based on the first and second temporal patterns of communication states, a schedule for communicating with the first node on a second set of resources that are multiplexed with the first set of resources in a frequency domain, a spatial domain, or a combination thereof.

When the device 705, with communications manager 805, is configured as a scheduled node, the request manager 820 may receive, from the second node, a request for the first temporal pattern of communication states, where the indication is transmitted in response to the request.

In some examples when the device 705, with communications manager 805, is configured as a scheduling node, the request manager 820 may transmit a request for the first temporal pattern of communication states to the first node.

In some examples when the device 705, with communications manager 805, is configured as a scheduling node, the request manager 820 may receive, from the first node, an indication of the first temporal pattern of communication states.

In some examples when the device 705, with communications manager 805, is configured as a scheduling node, the request manager 820 may configure the first node for communication on the first set of resources.

In some examples when the device 705, with communications manager 805, is configured as a scheduling node, the request manager 820 may receive, from the first node or from a different node, a signal indicating the first temporal pattern of communication states.

When the device 705, with communications manager 805, is configured as a scheduled node, the resource manager 825 may receive, from the second node or from a different node, a signal identifying the first set of resources, the second set of resources, or a combination thereof.

In some examples when the device 705, with communications manager 805, is configured as a scheduling node, the resource manager 825 may receive, from the first node or from a different node, a signal identifying the first set of resources, the second set of resources, or a combination thereof.

When the device 705, with communications manager 805, is configured as a scheduled node, the multiplexed communication manager 830 may perform, using the second set of resources in accordance with the grant, at least one of receiving a downlink communication from the second node or transmitting an uplink communication during a time period that is associated with the first node and the second node being in an idle mode in accordance with the first and second temporal patterns of communication states.

In some examples when the device 705, with communications manager 805, is configured as a scheduled node, the multiplexed communication manager 830 may receive, using the second set of resources in accordance with the grant, a downlink communication from the second node during a time period that is associated with the first node being in an idle mode or a receive mode in accordance with the first temporal pattern of communication states.

In some examples when the device 705, with communications manager 805, is configured as a scheduled node, the multiplexed communication manager 830 may transmit, using the second set of resources in accordance with the grant, an uplink communication to the second node during a time period that is associated with the first node being in an idle mode or a transmit mode in accordance with the first temporal pattern of communication states.

In some examples when the device 705, with communications manager 805, is configured as a scheduling node, the multiplexed communication manager 830 may perform, using the second set of resources and in accordance with the grant, at least one of receiving an uplink communication from the first node or transmitting a downlink communication to the first node during a time period that is associated with the first node and the second node being in an idle mode in accordance with the first and second temporal patterns of communication states.

In some examples when the device 705, with communications manager 805, is configured as a scheduling node, the multiplexed communication manager 830 may receive, using the second set of resources and in accordance with the grant, an uplink communication from the first node during a time period that is associated with the first node being in an idle mode or a transmit mode and the second node being in a receive mode in accordance with the first and second temporal patterns of communication states.

In some examples when the device 705, with communications manager 805, is configured as a scheduling node, the multiplexed communication manager 830 may transmit, using the second set of resources and in accordance with the grant, a downlink communication to the first node during a time period that is associated with the first node being in an idle mode or a receive mode and the second node being in a transmit mode in accordance with the first and second temporal patterns of communication states. In some cases, the network includes an IAB network. In some cases, the first set of resources are associated with access communications and the second set of resources are associated with at least one of a backhaul communications, an access communications, or a combination thereof.

In some cases, the network includes an IAB network. In some cases, the first set of resources are associated with access communications and the second set of resources are associated with at least one of a backhaul communications, an access communications, or a combination thereof. In some cases, the second set of resources are associated with an IAB network, and where the first and/or second temporal patterns of communication states is based on an inter-relay discovery communications in the IAB network.

Figure 9:
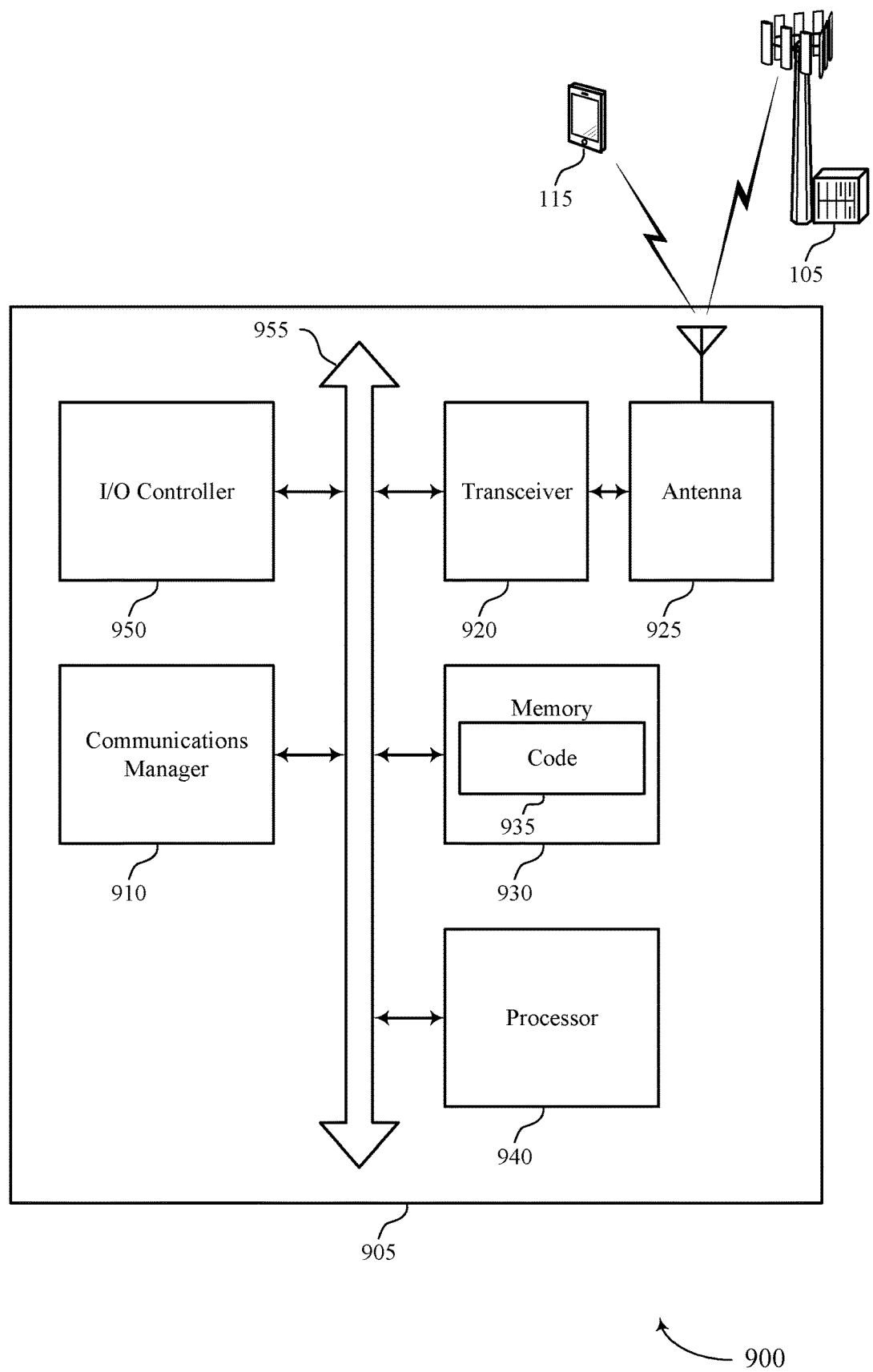
FIG. 9 shows a diagram of a system including a user equipment (UE) in accordance with aspects of the present disclosure.

FIG. 9 shows a diagram of a system 900 including a device 905 in accordance with aspects of the present disclosure. The device 905 may be an example of or include the components of device 605, device 705, a scheduling node, a scheduled node, an AN, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

When the device 905 is configured as a scheduled node, the communications manager 910 may transmit, by a first node in the network and to a second node in the network, an indication of a first temporal pattern of communication states for communication by the first node on a first set of resources, the first node being configured for half-duplex communications and receive, from the second node, a grant of resources for performing communications on a second set of resources that are multiplexed with the first set of resources in a frequency domain, a spatial domain, or a combination thereof. When the device 905 is configured as a scheduling node, the communications manager 910 may also identify, at a second node in the network, a first temporal pattern of communication states for communication by a first node in the network on a first set of resources, the first node being configured for half-duplex communications, identify, at the second node in a network, a second temporal pattern of communication states for communicating on the first set of resources, the second node being configured for half-duplex communications, determine, based on the first and second temporal patterns of communication states, a schedule for communicating with the first node on a second set of resources that are multiplexed with the first set of resources in a frequency domain, a spatial domain, or a combination thereof, and transmit, to the first node, a grant of resources for communications via the second set of resources in accordance with the schedule.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting scheduling over multiplexed resources under half-duplex constraint).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
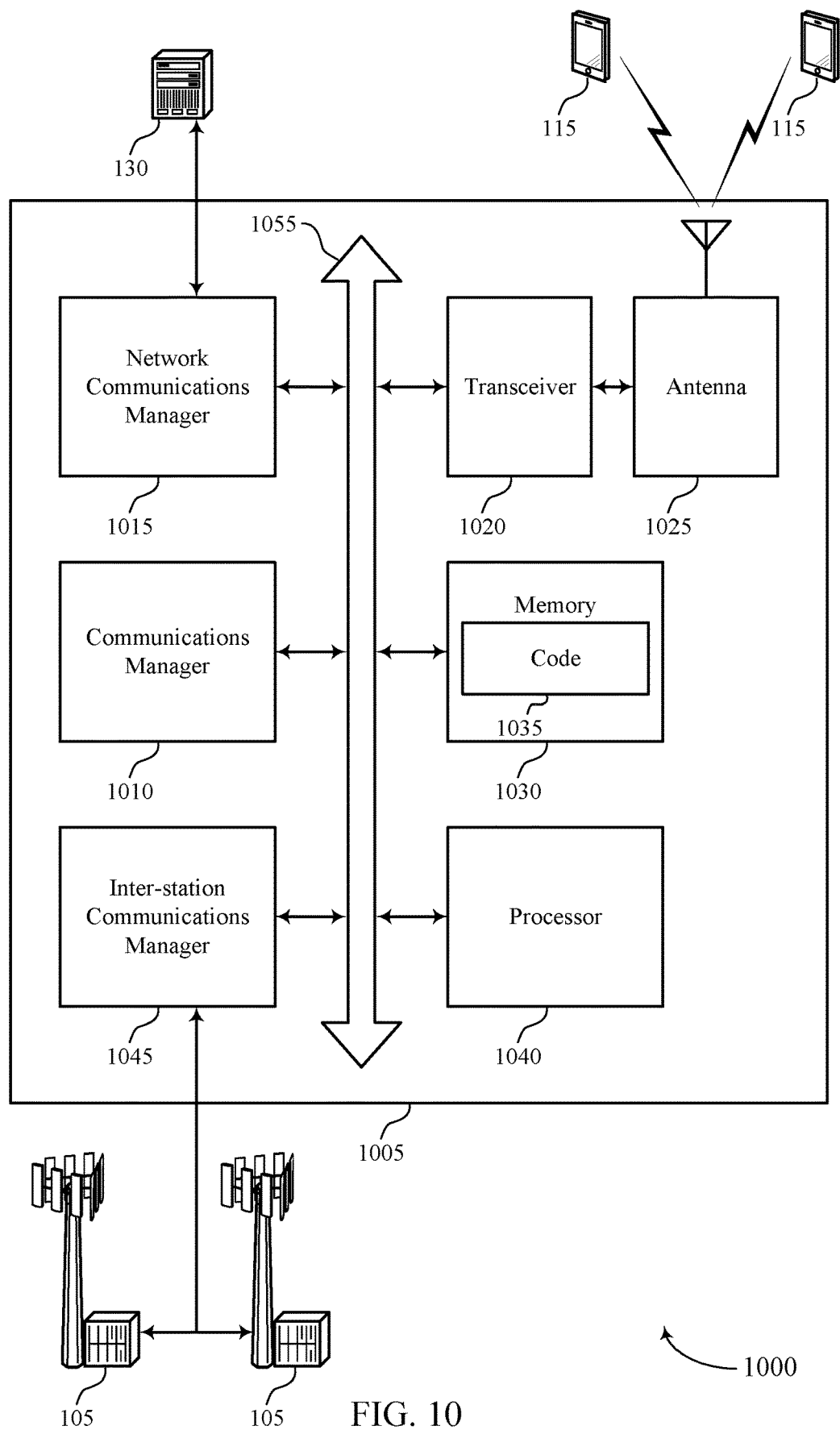
FIG. 10 shows a diagram of a system including a base station in accordance with aspects of the present disclosure.

FIG. 10 shows a diagram of a system 1000 including a device 1005 in accordance with aspects of the present disclosure. The device 1005 may be an example of or include the components of device 605, device 705, a scheduling node, a scheduled node, an AN, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

When the device 1005 is configured as a scheduled node, the communications manager 1010 may transmit, by a first node in the network and to a second node in the network, an indication of a first temporal pattern of communication states for communication by the first node on a first set of resources, the first node being configured for half-duplex communications and receive, from the second node, a grant of resources for performing communications on a second set of resources that are multiplexed with the first set of resources in a frequency domain, a spatial domain, or a combination thereof. When the device 1005 is configured as a scheduling node, the communications manager 1010 may also identify, at a second node in the network, a first temporal pattern of communication states for communication by a first node in the network on a first set of resources, the first node being configured for half-duplex communications, identify, at the second node in a network, a second temporal pattern of communication states for communicating on the first set of resources, the second node being configured for half-duplex communications, determine, based on the first and second temporal patterns of communication states, a schedule for communicating with the first node on a second set of resources that are multiplexed with the first set of resources in a frequency domain, a spatial domain, or a combination thereof, and transmit, to the first node, a grant of resources for communications via the second set of resources in accordance with the schedule.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting scheduling over multiplexed resources under half-duplex constraint).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
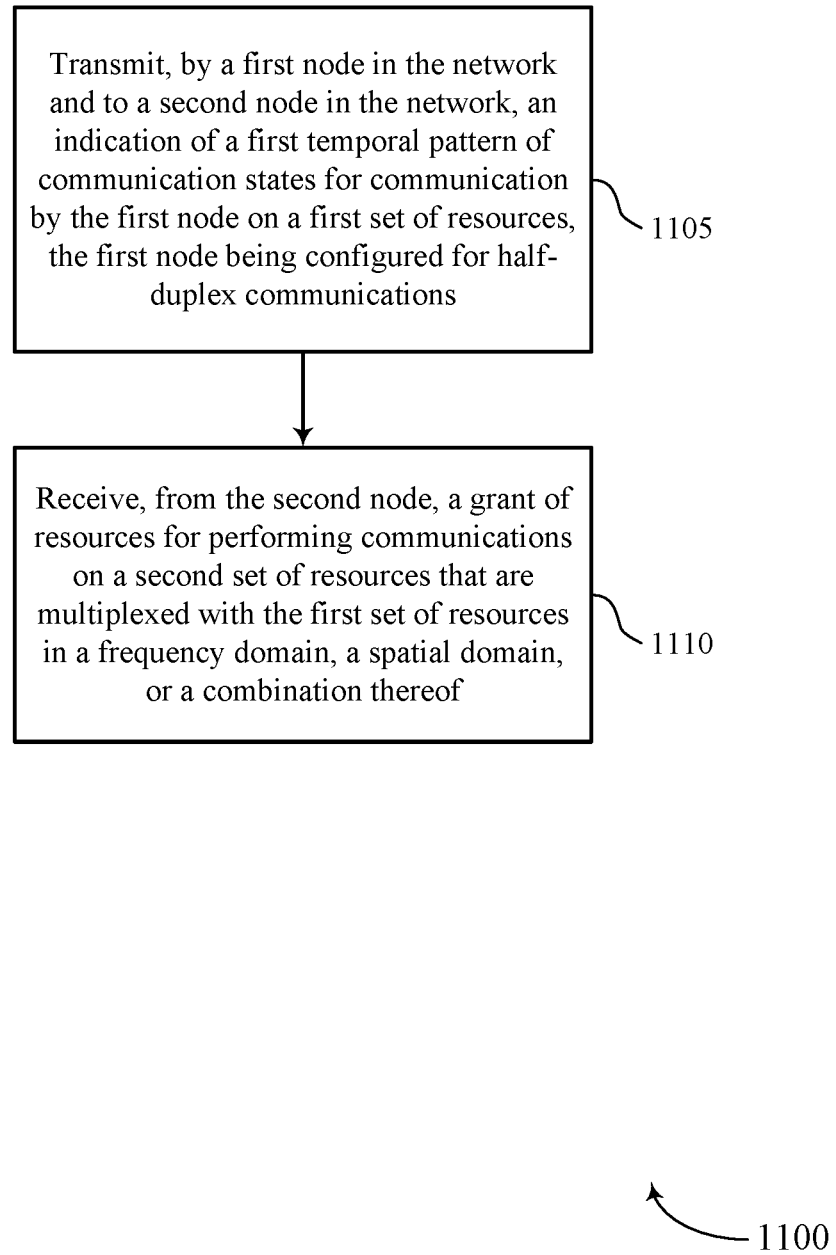
FIGS. 11 through 14 show flowcharts illustrating methods in accordance with aspects of the present disclosure.

FIG. 11 shows a flowchart illustrating a method 1100 in accordance with aspects of the present disclosure. The operations of method 1100 may be implemented by a UE 115 or base station 105, which may be configured as a scheduled node or AN, or its components as described herein. For example, the operations of method 1100 may be performed by a communications manager as described with reference to FIGS. 6 to 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may transmit, by a first node in the network and to a second node in the network, an indication of a first temporal pattern of communication states for communication by the first node on a first set of resources, the first node being configured for half-duplex communications. The operations of 1105 may be performed according to the methods described herein. In some examples, aspects of the operations of 1105 may be performed by a temporal pattern manager as described with reference to FIGS. 6 to 10.

At 1110, the UE or base station may receive, from the second node, a grant of resources for performing communications on a second set of resources that are multiplexed with the first set of resources in a frequency domain, a spatial domain, or a combination thereof. The operations of 1110 may be performed according to the methods described herein. In some examples, aspects of the operations of 1110 may be performed by a grant manager as described with reference to FIGS. 6 to 10.

Figure 12:
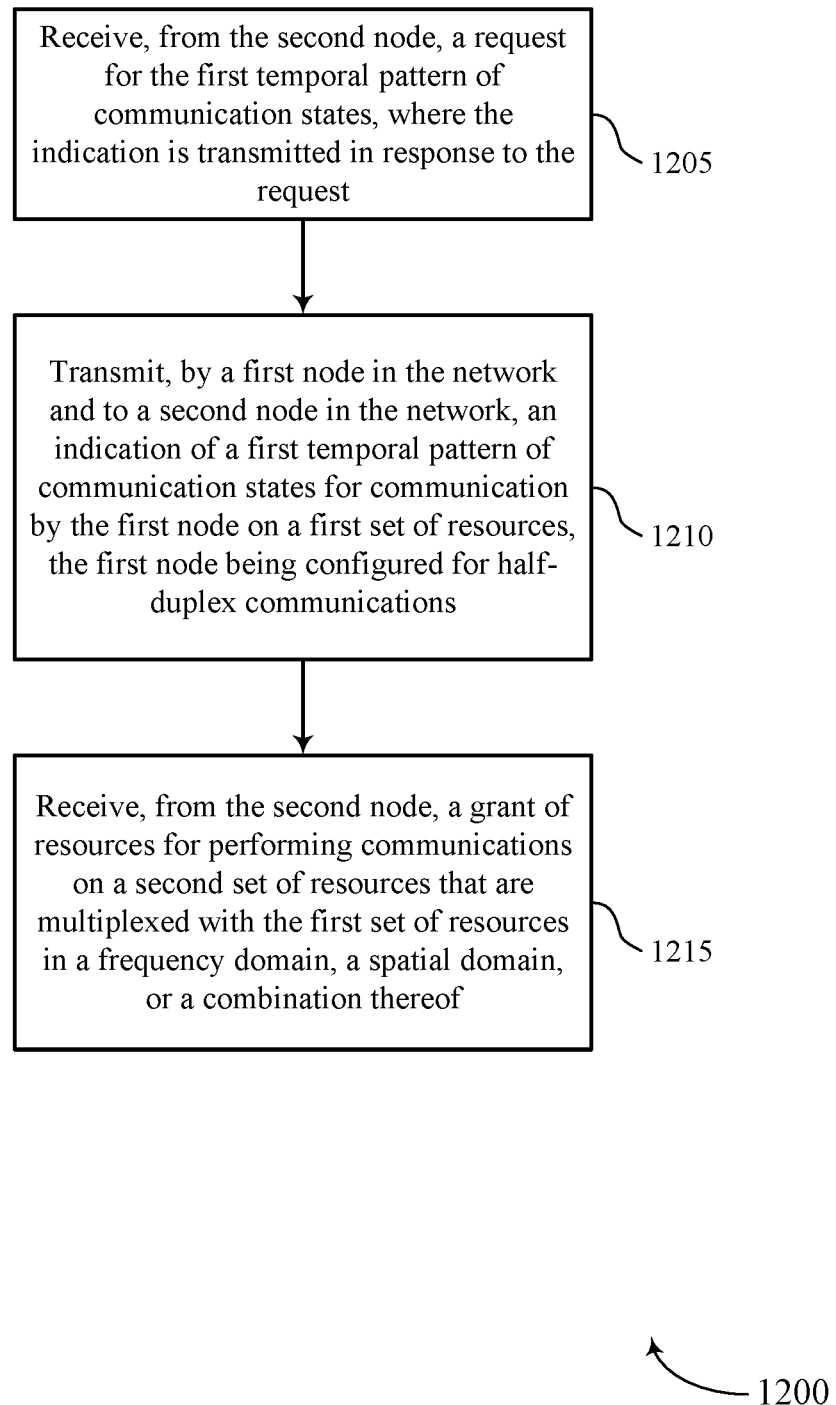

FIG. 12 shows a flowchart illustrating a method 1200 in accordance with aspects of the present disclosure. The operations of method 1200 may be implemented by a UE 115 or base station 105, which may be configured as a scheduled node or AN, or its components as described herein. For example, the operations of method 1200 may be performed by a communications manager as described with reference to FIGS. 6 to 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may receive, from the second node, a request for the first temporal pattern of communication states, where the indication is transmitted in response to the request. The operations of 1205 may be performed according to the methods described herein. In some examples, aspects of the operations of 1205 may be performed by a request manager as described with reference to FIGS. 6 to 10.

At 1210, the UE or base station may transmit, by a first node in the network and to a second node in the network, an indication of a first temporal pattern of communication states for communication by the first node on a first set of resources, the first node being configured for half-duplex communications. The operations of 1210 may be performed according to the methods described herein. In some examples, aspects of the operations of 1210 may be performed by a temporal pattern manager as described with reference to FIGS. 6 to 10.

At 1215, the UE or base station may receive, from the second node, a grant of resources for performing communications on a second set of resources that are multiplexed with the first set of resources in a frequency domain, a spatial domain, or a combination thereof. The operations of 1215 may be performed according to the methods described herein. In some examples, aspects of the operations of 1215 may be performed by a grant manager as described with reference to FIGS. 6 to 10.

Figure 13:
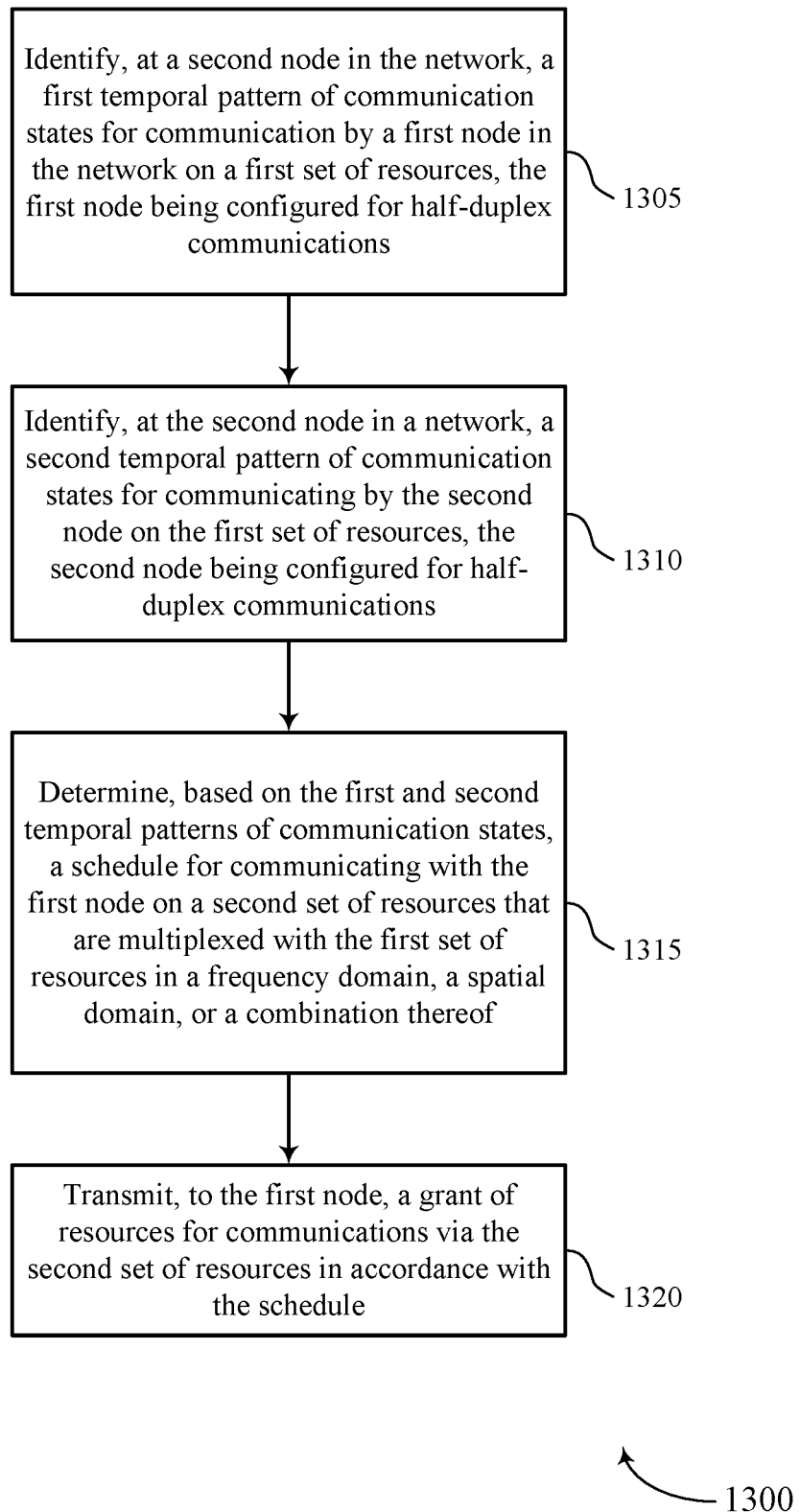

FIG. 13 shows a flowchart illustrating a method 1300 in accordance with aspects of the present disclosure. The operations of method 1300 may be implemented by a UE 115 or base station 105, which may be configured as a scheduling node or AN, or its components as described herein. For example, the operations of method 1300 may be performed by a communications manager as described with reference to FIGS. 6 to 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may identify, at a second node in the network, a first temporal pattern of communication states for communication by a first node in the network on a first set of resources, the first node being configured for half-duplex communications. The operations of 1305 may be performed according to the methods described herein. In some examples, aspects of the operations of 1305 may be performed by a temporal pattern manager as described with reference to FIGS. 6 to 10.

At 1310, the UE or base station may identify, at the second node in a network, a second temporal pattern of communication states for communicating by the second node on the first set of resources, the second node being configured for half-duplex communications. The operations of 1310 may be performed according to the methods described herein. In some examples, aspects of the operations of 1310 may be performed by a temporal pattern manager as described with reference to FIGS. 6 to 10.

At 1315, the UE or base station may determine, based on the first and second temporal patterns of communication states, a schedule for communicating with the first node on a second set of resources that are multiplexed with the first set of resources in a frequency domain, a spatial domain, or a combination thereof. The operations of 1315 may be performed according to the methods described herein. In some examples, aspects of the operations of 1315 may be performed by a communication schedule manager as described with reference to FIGS. 6 to 10.

At 1320, the UE or base station may transmit, to the first node, a grant of resources for communications via the second set of resources in accordance with the schedule. The operations of 1320 may be performed according to the methods described herein. In some examples, aspects of the operations of 1320 may be performed by a grant manager as described with reference to FIGS. 6 to 10.

Figure 14:
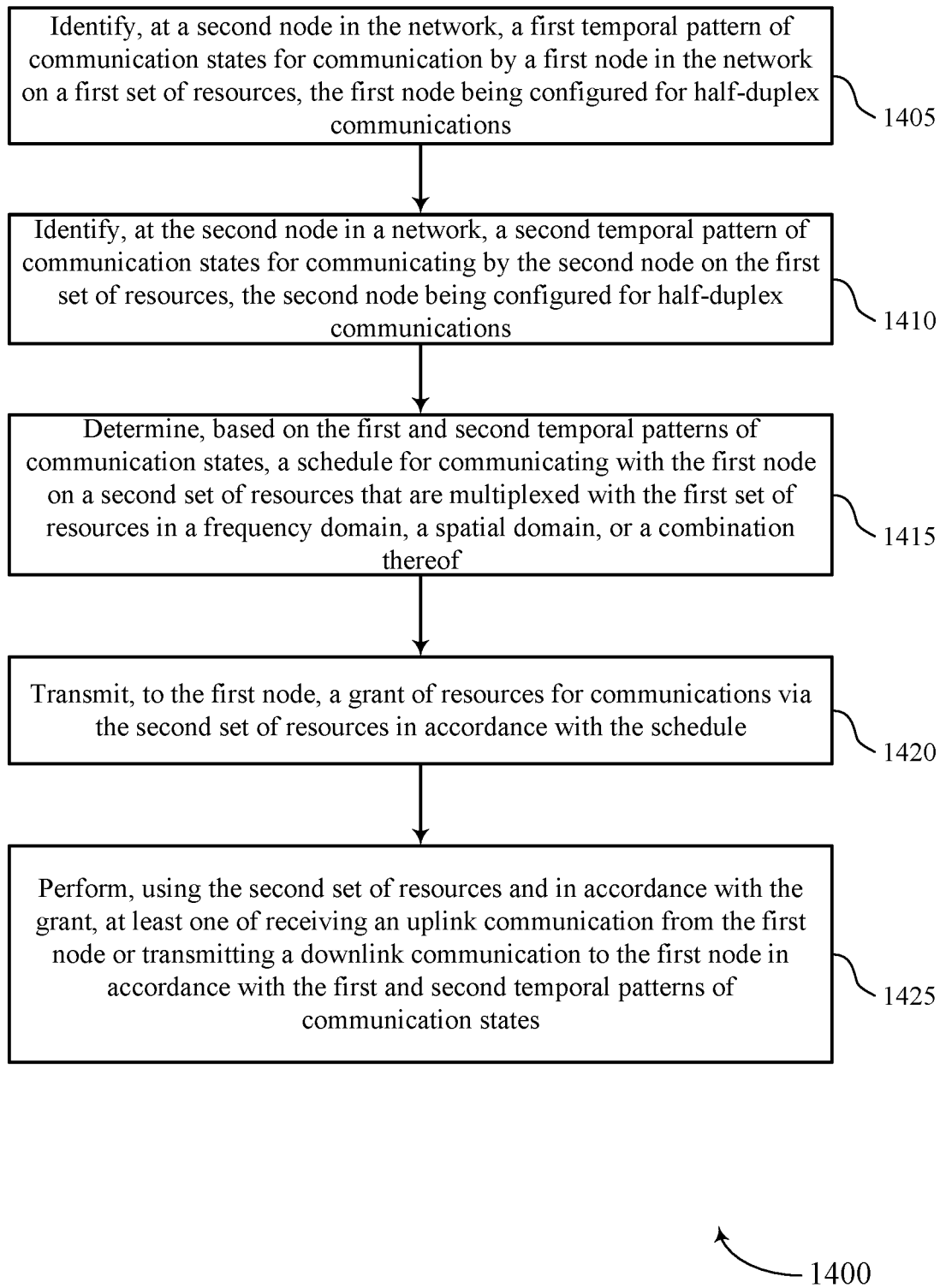

FIG. 14 shows a flowchart illustrating a method 1400 in accordance with aspects of the present disclosure. The operations of method 1400 may be implemented by a UE 115 or base station 105, which may be configured as a scheduling node or AN, or its components as described herein. For example, the operations of method 1400 may be performed by a communications manager as described with reference to FIGS. 6 to 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may identify, at a second node in the network, a first temporal pattern of communication states for communication by a first node in the network on a first set of resources, the first node being configured for half-duplex communications. The operations of 1405 may be performed according to the methods described herein. In some examples, aspects of the operations of 1405 may be performed by a temporal pattern manager as described with reference to FIGS. 6 to 10.

At 1410, the UE or base station may identify, at the second node in a network, a second temporal pattern of communication states for communicating by the second node on the first set of resources, the second node being configured for half-duplex communications. The operations of 1410 may be performed according to the methods described herein. In some examples, aspects of the operations of 1410 may be performed by a temporal pattern manager as described with reference to FIGS. 6 to 10.

At 1415, the UE or base station may determine, based on the first and second temporal patterns of communication states, a schedule for communicating with the first node on a second set of resources that are multiplexed with the first set of resources in a frequency domain, a spatial domain, or a combination thereof. The operations of 1415 may be performed according to the methods described herein. In some examples, aspects of the operations of 1415 may be performed by a communication schedule manager as described with reference to FIGS. 6 to 10.

At 1420, the UE or base station may transmit, to the first node, a grant of resources for communications via the second set of resources in accordance with the schedule. The operations of 1420 may be performed according to the methods described herein. In some examples, aspects of the operations of 1420 may be performed by a grant manager as described with reference to FIGS. 6 to 10.

At 1425, the UE or base station may perform, using the second set of resources and in accordance with the grant, at least one of receiving an uplink communication from the first node or transmitting a downlink communication to the first node in accordance with the first and second temporal patterns of communication states. The operations of 1425 may be performed according to the methods described herein. In some examples, aspects of the operations of 1425 may be performed by a multiplexed communication manager as described with reference to FIGS. 6 to 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a network, comprising:
    transmitting, by a first node in the network and to a second node in the network, an indication of a first temporal pattern of communication states for communication by the first node on a first set of resources, the first node being configured for half-duplex communications; and
    receiving, from the second node, a grant of resources for performing communications on a second set of resources that are multiplexed with the first set of resources in a frequency domain, a spatial domain, or a combination thereof.

2. The method of claim 1, further comprising:
    receiving, from the second node, a request for the first temporal pattern of communication states, wherein the indication is transmitted in response to the request.

3. The method of claim 1, further comprising:
    receiving, from the second node or from a different node, a signal identifying the first set of resources, the second set of resources, or a combination thereof.

4. The method of claim 1, further comprising:
    performing, using the second set of resources in accordance with the grant, at least one of receiving a downlink communication from the second node or transmitting an uplink communication during a time period that is associated with the first node being in an idle mode in accordance with the first temporal pattern of communication states.

5. The method of claim 1, further comprising:
    receiving, using the second set of resources in accordance with the grant, a downlink communication from the second node during a time period that is associated with the first node being in an idle mode or a receive mode in accordance with the first temporal pattern of communication states.

6. The method of claim 1, further comprising:
    transmitting, using the second set of resources in accordance with the grant, an uplink communication to the second node during a time period that is associated with the first node being in an idle mode or a transmit mode in accordance with the first temporal pattern of communication states.

7. The method of claim 1, wherein the grant of resources is based at least in part on the indication.

8. The method of claim 1, wherein the grant of resources is for performing communications with the second node.

9. The method of claim 1, wherein the network comprises an integrated access and backhaul (IAB) network.

10. The method of claim 1, wherein the first set of resources are associated with access communications and the second set of resources are associated with at least one of a backhaul communications, an access communications, or a combination thereof.

11. The method of claim 1, wherein the second set of resources are associated with a backhaul communications in an integrated access and backhaul (IAB) network, and wherein the first temporal pattern of communication states is based at least in part on an inter-relay discovery communications in the IAB network.

12. A method for wireless communication in a network, comprising:
    identifying, at a second node in the network, a first temporal pattern of communication states for communication by a first node in the network on a first set of resources, the first node being configured for half-duplex communications;
    identifying, at the second node in a network, a second temporal pattern of communication states for communicating on the first set of resources, the second node being configured for half-duplex communications;
    determining, based on the first and second temporal patterns of communication states, a schedule for communicating with the first node on a second set of resources that are multiplexed with the first set of resources in a frequency domain, a spatial domain, or a combination thereof; and
    transmitting, to the first node, a grant of resources for communications via the second set of resources in accordance with the schedule.

13. The method of claim 12, wherein identifying the first temporal pattern of communication states comprises:
    transmitting a request for the first temporal pattern of communication states to the first node; and
    receiving, from the first node, an indication of the first temporal pattern of communication states.

14. The method of claim 12, wherein identifying the first temporal pattern of communication states comprises:
    configuring the first node for communication on the first set of resources.

15. The method of claim 12, wherein identifying the first temporal pattern of communication states comprises:
    receiving, from the first node or from a different node, a signal indicating the first temporal pattern of communication states.

16. The method of claim 12, further comprising:
    receiving, from the first node or from a different node, a signal identifying the first set of resources, the second set of resources, or a combination thereof.

17. The method of claim 12, further comprising:
    performing, using the second set of resources and in accordance with the grant, at least one of receiving an uplink communication from the first node or transmitting a downlink communication to the first node during a time period that is associated with the first node and the second node being in an idle mode in accordance with the first and second temporal patterns of communication states.

18. The method of claim 12, further comprising:
receiving, using the second set of resources and in accordance with the grant, an uplink communication from the first node during a time period that is associated with the first node being in an idle mode or a transmit mode and the second node being in a receive mode in accordance with the first and second temporal patterns of communication states.

19. The method of claim 12, further comprising:
transmitting, using the second set of resources and in accordance with the grant, a downlink communication to the first node during a time period that is associated with the first node being in an idle mode or a receive mode and the second node being in a transmit mode in accordance with the first and second temporal patterns of communication states.

20. The method of claim 12, wherein the grant of resources is for communications between the first node and the second node.

21. The method of claim 12, wherein the network comprises an integrated access and backhaul (IAB) network between the first node and the second node.

22. The method of claim 12, wherein the first set of resources are associated with access communications and the second set of resources are associated with at least one of a backhaul communications, an access communications, or a combination thereof.

23. The method of claim 12, wherein the second set of resources are associated with an integrated access and backhaul (IAB) network, and wherein the first and second temporal patterns of communication states is based at least in part on an inter-relay discovery communications in the IAB network.

24. An apparatus for wireless communication in a network, comprising:
a processor,
memory in electronic communication with the processor; and
instructions stored in the memory and executable by the processor to cause the apparatus to:
transmit, by a first node in the network and to a second node in the network, an indication of a first temporal pattern of communication states for communication by the first node on a first set of resources, the first node being configured for half-duplex communications; and
receive, from the second node, a grant of resources for performing communications on a second set of resources that are multiplexed with the first set of resources in a frequency domain, a spatial domain, or a combination thereof.

25. The apparatus of claim 24, wherein the instructions are further executable by the processor to cause the apparatus to:
receive, from the second node, a request for the first temporal pattern of communication states, wherein the indication is transmitted in response to the request.

26. The apparatus of claim 24, wherein the instructions are further executable by the processor to cause the apparatus to:
receive, from the second node or from a different node, a signal identifying the first set of resources, the second set of resources, or a combination thereof.

27. The apparatus of claim 24, wherein the instructions are further executable by the processor to cause the apparatus to:
perform, using the second set of resources in accordance with the grant, at least one of receiving a downlink communication from the second node or transmitting an uplink communication during a time period that is associated with the first node and the second node being in an idle mode in accordance with the first and second temporal patterns of communication states.

28. An apparatus for wireless communication in a network, comprising:
a processor,
memory in electronic communication with the processor; and
instructions stored in the memory and executable by the processor to cause the apparatus to:
identify, at a second node in the network, a first temporal pattern of communication states for communication by a first node in the network on a first set of resources, the first node being configured for half-duplex communications;
identify, at the second node in a network, a second temporal pattern of communication states for communicating on the first set of resources, the second node being configured for half-duplex communications;
determine, based on the first and second temporal patterns of communication states, a schedule for communicating with the first node on a second set of resources that are multiplexed with the first set of resources in a frequency domain, a spatial domain, or a combination thereof; and
transmit, to the first node, a grant of resources for communications via the second set of resources in accordance with the schedule.

29. The apparatus of claim 28, wherein the instructions to identify the first temporal pattern of communication states are executable by the processor to cause the apparatus to:
transmit a request for the first temporal pattern of communication states to the first node; and
receive, from the first node, an indication of the first temporal pattern of communication states.

30. The apparatus of claim 28, wherein the instructions to identify the first temporal pattern of communication states are executable by the processor to cause the apparatus to:
configure the first node for communication on the first set of resources.

* * * * *